US011976778B2

(12) United States Patent
Grey et al.

(10) Patent No.: US 11,976,778 B2
(45) Date of Patent: May 7, 2024

(54) GUN-MOUNTED TELESCOPING SUPPORT STAND APPARATUS

(71) Applicant: Bushnell Holdings, Inc., Overland Park, KS (US)

(72) Inventors: Garrett T. Grey, Brandon, MS (US); Jacob R. Thomason, Madison, MS (US)

(73) Assignee: Bushnell Holdings, Inc., Overland Park, KS (US)

( * ) Notice: Subject to any disclaimer, the term of this patent is extended or adjusted under 35 U.S.C. 154(b) by 0 days.

(21) Appl. No.: 18/082,116

(22) Filed: Dec. 15, 2022

(65) Prior Publication Data

US 2023/0184371 A1  Jun. 15, 2023

Related U.S. Application Data

(60) Provisional application No. 63/289,989, filed on Dec. 15, 2021, provisional application No. 63/289,917, filed on Dec. 15, 2021.

(51) Int. Cl.
| | |
|---|---|
| *F16M 11/00* | (2006.01) |
| *F16M 11/14* | (2006.01) |
| *F16M 11/26* | (2006.01) |
| *F16M 11/34* | (2006.01) |
| *F41A 23/14* | (2006.01) |
| *G03B 17/56* | (2021.01) |

(52) U.S. Cl.
CPC .............. *F16M 11/26* (2013.01); *F16M 11/14* (2013.01); *F16M 11/34* (2013.01); *F16M 2200/027* (2013.01); *F41A 23/14* (2013.01); *G03B 17/561* (2013.01)

(58) Field of Classification Search
CPC .................. F16M 11/26; F16M 2200/027
See application file for complete search history.

(56) References Cited

U.S. PATENT DOCUMENTS

| | | | | | |
|---|---|---|---|---|---|
| 3,632,073 | A | * | 1/1972 | Nakatani ................ | F16M 11/14 248/169 |
| 4,121,799 | A | * | 10/1978 | Michio .................. | F16M 11/38 248/188.7 |
| 4,579,436 | A | * | 4/1986 | Jaumann ................ | F16M 11/34 396/419 |
| 5,863,015 | A | * | 1/1999 | Hsu ...................... | F16M 11/242 248/157 |

(Continued)

FOREIGN PATENT DOCUMENTS

| | | |
|---|---|---|
| DE | 1773269 A1 | 6/1971 |
| DE | 4202825 A1 | 8/1993 |

(Continued)

OTHER PUBLICATIONS

International Search Report and Written Opinion mailed Mar. 30, 2023, for related International Application No. PCT/US2022/053072 (16 pages).

(Continued)

*Primary Examiner* — Amy J. Sterling
(74) *Attorney, Agent, or Firm* — Reed Smith LLP; Walter M. Egbert, III; Richard J. Brown

(57) ABSTRACT

An accessory or gun-mounted support stand apparatus including a release mechanism and locking mechanism configured to allow or prevent longitudinal movement of telescoping legs.

20 Claims, 26 Drawing Sheets

(56) References Cited

U.S. PATENT DOCUMENTS

| | | | |
|---|---|---|---|
| 6,824,319 B1 * | 11/2004 | Speggiorin | F16C 11/10 |
| | | | 396/428 |
| 6,913,231 B2 * | 7/2005 | Speggiorin | F16M 11/32 |
| | | | 403/109.5 |
| 7,364,125 B2 * | 4/2008 | Speggiorin | F16M 11/14 |
| | | | 248/182.1 |
| 7,845,602 B1 | 12/2010 | Young et al. | |
| 8,146,876 B1 | 4/2012 | Young et al. | |
| 8,256,732 B1 | 9/2012 | Young et al. | |
| 8,336,835 B1 * | 12/2012 | Benner | E04F 21/1805 |
| | | | 248/200.1 |
| 8,376,646 B2 * | 2/2013 | Melino, Sr. | F16B 7/1454 |
| | | | 403/322.4 |
| 8,469,326 B1 | 6/2013 | Young et al. | |
| 8,714,508 B1 | 5/2014 | Young et al. | |
| 9,010,710 B1 | 4/2015 | Young et al. | |
| 10,612,719 B2 * | 4/2020 | Li | F16M 11/245 |
| 10,724,681 B2 | 7/2020 | Gearing et al. | |
| 10,808,880 B1 | 10/2020 | Gearing | |
| 11,293,587 B2 * | 4/2022 | Dal Ben | F16M 11/28 |
| 11,306,862 B1 * | 4/2022 | Ye | F16M 11/14 |
| 11,339,916 B2 * | 5/2022 | Smith | F16M 11/10 |
| 11,441,589 B1 * | 9/2022 | Ravnaas | F16M 11/26 |
| 2017/0146891 A1 * | 5/2017 | Chen | G03B 17/561 |
| 2021/0088303 A1 * | 3/2021 | Amaral | F16M 11/041 |
| 2021/0190261 A1 | 6/2021 | Warner | |
| 2021/0278161 A1 | 9/2021 | Gearing | |
| 2022/0291574 A1 * | 9/2022 | Speggiorin | F16M 11/26 |

FOREIGN PATENT DOCUMENTS

| | | |
|---|---|---|
| EP | 3311061 B1 | 4/2018 |
| EP | 2880352 B1 | 9/2020 |
| WO | 2011026444 A1 | 3/2011 |
| WO | 2013133461 A1 | 9/2013 |

OTHER PUBLICATIONS

International Search Report and Written Opinion mailed Apr. 3, 2023, for related International Application No. PCT/US2022/052981 (16 pages).

* cited by examiner

GUN-MOUNTED TELESCOPING SUPPORT STAND APPARATUS

CROSS REFERENCE TO RELATED APPLICATIONS

This application claims priority to U.S. Provisional Patent Application Ser. No. 63/289,989, filed Dec. 15, 2021, and U.S. Provisional Patent Application Ser. No. 63/289,917, filed Dec. 15, 2021, each of which is incorporated by reference in its entirety herein.

TECHNICAL FIELD

Exemplary embodiments disclosed herein relate to telescoping support stands.

BACKGROUND

Support stands, such as microphone stands and shooting stands, often include telescoping tubes that allow the height of the stands to be adjusted. These telescoping stands may have an inner tube, an outer tube, and a lock that keeps the inner tube from sliding relative to the outer tube. Some support stands are equipped with an external trigger connected to an internal lock that secures the inner tube to the outer tube. This locking configuration may allow a user to make quick height adjustments.

SUMMARY OF THE DISCLOSED SUBJECT MATTER

A first aspect provides a telescoping support stand, comprising: two extendable legs, each leg comprising an outer tube; an inner tube having a first end portion that telescopically slides within the outer tube and a second end portion; a locking mechanism mounted to the first end portion of the inner tube; a release assembly configured to release the locking mechanism and allow the first tube and the second tube to move relative to each other; a connection assembly comprising a connection housing mounted to a first end of the release assembly comprising a connection assembly tube coupled to the connection housing at a first end of the connection assembly tube, wherein the connection assembly tube is configured to couple the connection assembly to a trigger assembly; and the connection assembly tube is coupled to an accessory mounting assembly at a second end of the connection assembly tube, wherein the connection assembly tube is configured to couple the connection assembly to the accessory mounting assembly; and the trigger assembly comprises a trigger pivotally mounted to the connection assembly and movable relative to the release assembly to actuate the release assembly to release the locking mechanism, wherein the trigger comprises first and second ends, the first end being pivotally attached to the trigger assembly about a trigger pivot axis and the second end is configured to be operated by a user to actuate the trigger assembly; and an accessory mounting assembly disposed adjacent the trigger assembly configured to mount to an accessory.

Embodiments of the stand include the following, alone or in any combination.

The release assembly comprises a displacement member in contact with a release rod; a displacement rod operationally connected to the first end of the trigger operable to actuate the displacement member to move the release rod, the release rod releasing the locking mechanism to allow relative movement between the outer and inner tubes.

The connection assembly tube comprises a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of the displacement rod and is configured to have two curved ramp surfaces.

The extendable legs further comprise joint members disposed on ends thereof, wherein the joint members are positioned at least partially within the connection assembly housing, wherein a pair of curved actuation members each having a rollable wheel at a first end configured to rollably traverse one of the two curved ramp surfaces, either towards or away from a vertical axis of the support stand apparatus that passes through connection assembly bore as extendable legs hingeably extend or retract towards or away from the vertical axis, thereby widening or narrowing the stance of the support stand apparatus.

Each curved actuation member may be pivotally attached to an upper portion of an extendable leg and configured to follow along a respective curved ramp surface via the rollable wheel of the displacement member when the extendable legs angularly rotate to extend or retract from the vertical axis of the support stand apparatus.

The release rod comprise an upper tip configured to engage and travel along a flange on the curved actuation member.

The upper end of each extendable leg may be engaged to a respective actuation member via a rotation disk eccentrically mounted on a first pivot point, and connected to a second pivot point near its edge.

The locking mechanism comprises a plunger operationally connected to the release rod, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

The locking mechanism is configured to move between a first position preventing the inner tube and the outer tube from moving relative to each other and a second position wherein the inner tube and the outer tube are allowed to move relative to each other;

In the first position, the conical surface of the truncated cone member is in contact with the plurality of bearings, pressing them against an inner surface of the outer tube and preventing the inner tube and the outer tube from moving relative to each other. In the second position the conical surface of the truncated cone member allows the bearings to move out of contact with the inner surface, allowing the inner tube and the outer tube to move relative to each other.

The accessory mounting assembly comprises an accessory mounting assembly housing having an internal socket and a ball joint comprising a ball housed within the internal socket.

A second aspect provides a telescoping support stand, comprising: a plurality of extendable legs, each leg comprising an outer tube; an inner tube having a first end portion that telescopically slides within the outer tube and a second end portion; and a locking mechanism mounted to the first end portion of the inner tube comprising a plunger operationally connected to a release rod of a release assembly, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings; a connection assembly mounted to a first end of the release assembly comprising a connection housing and a connection assembly comprising a connection assembly tube comprising a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of the displacement rod and is configured to have curved ramp surfaces; the release assembly is configured to release the locking mechanism and allow the first tube and the second tube to move relative to each other, the release assembly comprising a displacement member in contact with a release rod; a displacement rod operable to actuate the displacement member to move the release rod, the release rod releasing the locking mechanism to allow relative movement between the outer and inner tubes; a trigger assembly comprising a trigger pivotally mounted to the connection assembly and movable relative to the release assembly to actuate the displacement rod, wherein the trigger comprises first and second ends, the first end being pivotally attached to the trigger assembly about a trigger pivot axis; and an accessory mounting assembly disposed adjacent the trigger assembly configured to mount to an accessory; wherein the plurality of extendable legs define a plane, and wherein the trigger pivot axis is substantially perpendicular to the plane defined by the plurality of extendable legs; wherein the trigger is configured to pivot about the trigger pivot axis such that it remains within the plane defined by the extendable legs.

Embodiments include the following and any of the previously described embodiments, alone or in any combination.

The trigger assembly further comprises a trigger assembly housing comprising a tubular clamp having opposed flanges, wherein the tubular clamp is configured to clamp around the connection assembly tube, and the trigger is pivotally mounted between the flanges.

The telescoping support stand comprises two extendable legs.

The extendable legs further comprise joint members disposed on ends thereof, wherein the joint members are positioned at least partially within the connection assembly housing, wherein a pair of curved actuation members each having a rollable wheel at a first end configured to rollably traverse the curved ramp surface of the displacement member, either towards or away from a vertical axis of the support stand apparatus that passes through connection assembly bore as extendable legs hingeably extend away from or retract towards the vertical axis, thereby widening or narrowing the stance of the support stand apparatus.

Each curved actuation member may be pivotally attached to an upper portion of an extendable leg and configured to follow along a respective curved ramp surface of the displacement member via the rollable wheel when the extendable legs angularly rotate to extend or retract from the vertical axis of the support stand apparatus.

The upper end of each extendable leg may be engaged to a respective actuation member via a rotation disk eccentrically mounted on a first pivot point, and connected to a second pivot point near its edge.

The locking mechanism is configured to move between a first position preventing the inner tube and the outer tube from moving relative to each other and a second position wherein the inner tube and the outer tube are allowed to move relative to each other;

In the first position, the conical surface of the truncated cone member is in contact with the plurality of bearings, pressing them against an inner surface of the outer tube and preventing the inner tube and the outer tube from moving relative to each other. In the second position the conical surface of the truncated cone member allows the bearings to move out of contact with the inner surface, allowing the inner tube and the outer tube to move relative to each other.

A third aspect provides an accessory mount configured to attach to the telescoping support stands described above comprising an accessory mounting assembly housing having an internal socket and a ball joint comprising a ball housed within the internal socket.

BRIEF DESCRIPTION OF THE DRAWINGS

Various embodiments of the disclosure are described herein in by way of example in conjunction with the following figures, wherein like reference characters designate the same or similar elements.

DETAILED DESCRIPTION

The telescoping support stand may comprise an accessory or accessory attachment member comprising a weapon mount, gun rest, gun mount, microphone clip, camera mount, telescope mount, projectile weapon, gun, rifle, crossbow, compressed-air gun, or other type of firearm or gun, camera, camcorder, laser rangefinder, professional photography equipment, telescope, or surveyors' equipment.

The disclosures of U.S. Pat. Nos. 9,010,710; 8,714,508; 8,469,326; 8,256,732; 8,146,876; and 7,845,602 are incorporated, in their entireties, by this reference.

Figure 1:
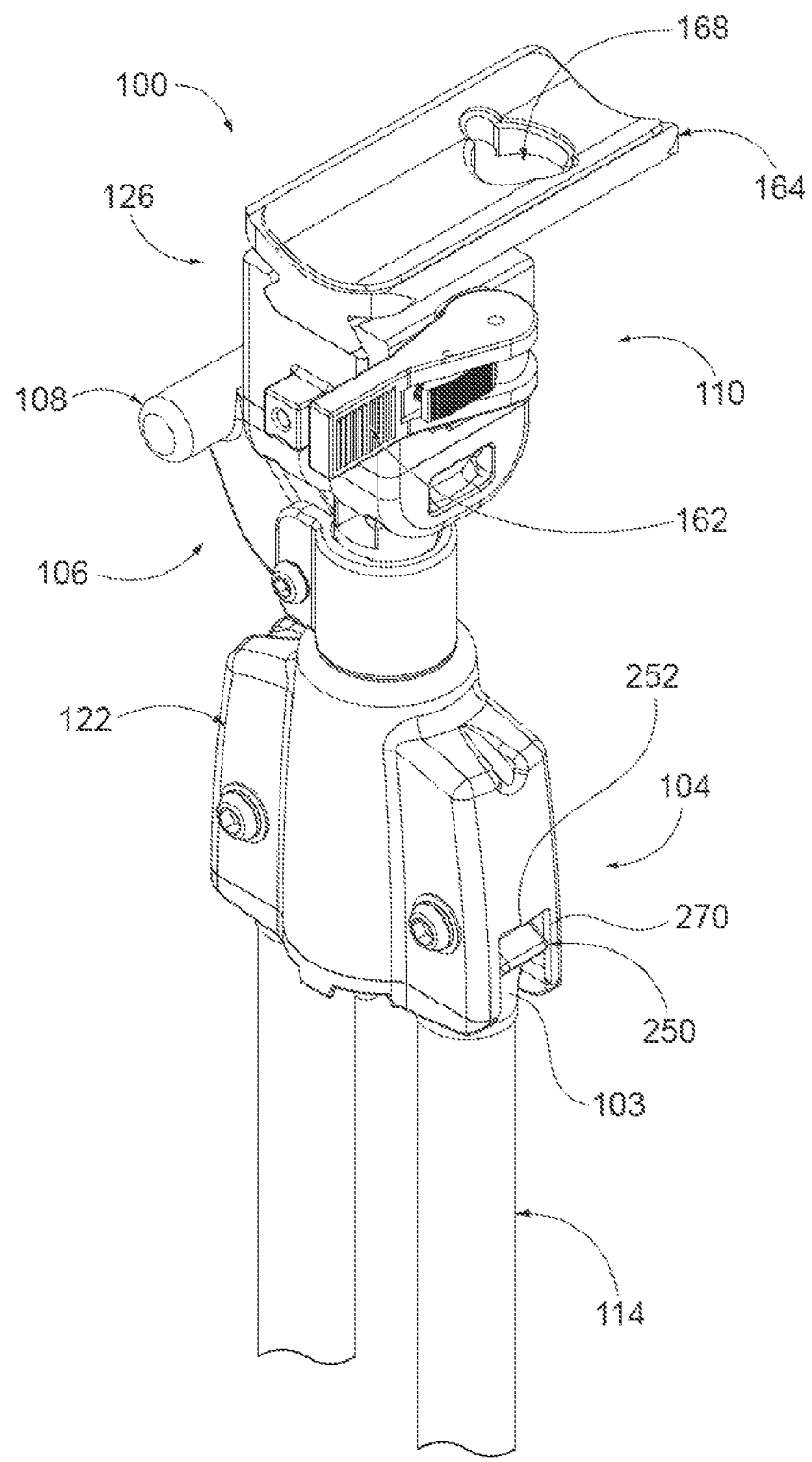
FIG. 1 is a detailed top rear perspective view of a gun-mounted telescoping support stand apparatus with legs disposed in a closed position in accordance with embodiments of the disclosure.
Figure 2:
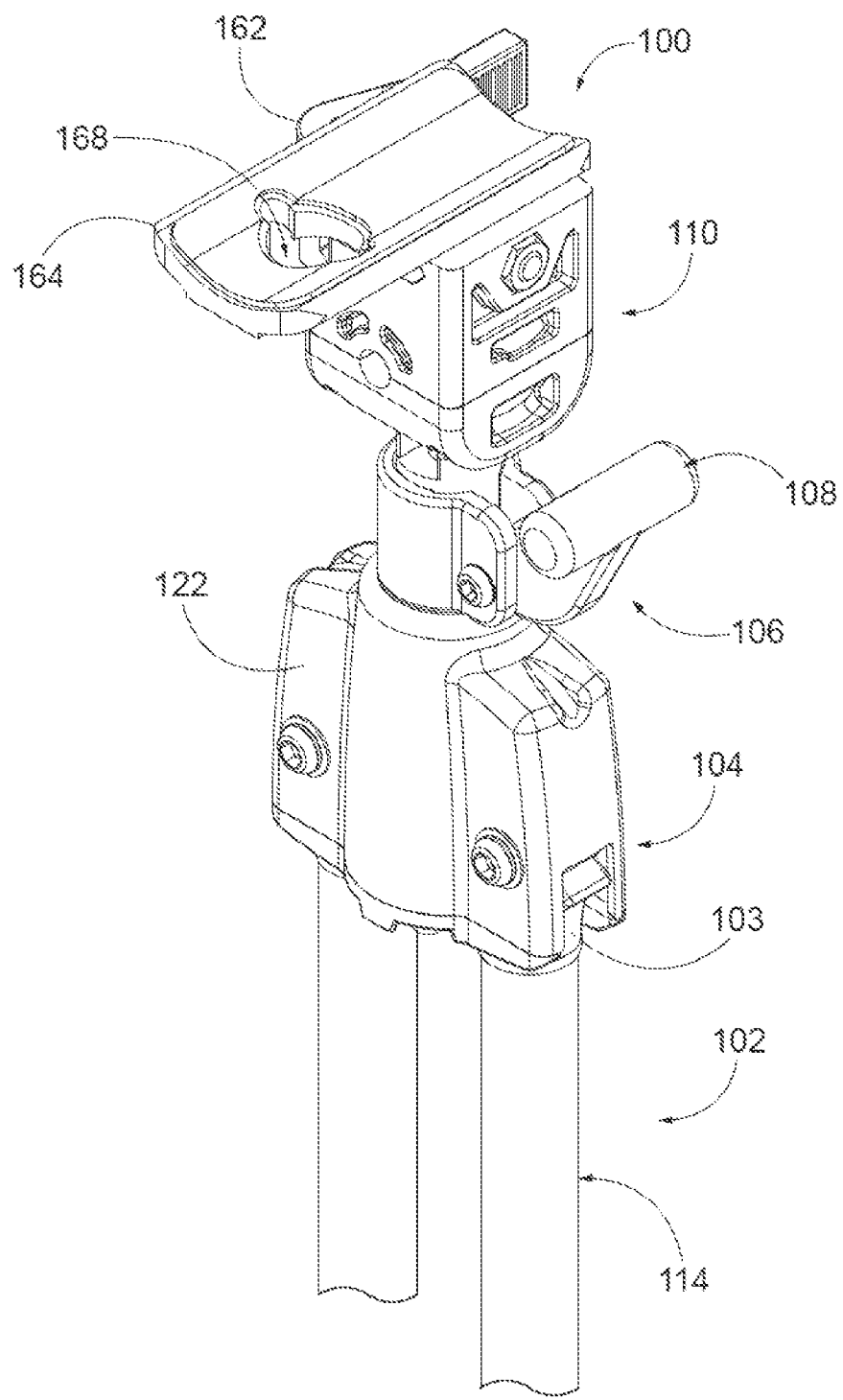
FIG. 2 is a detailed top front perspective view thereof.
Figure 3:
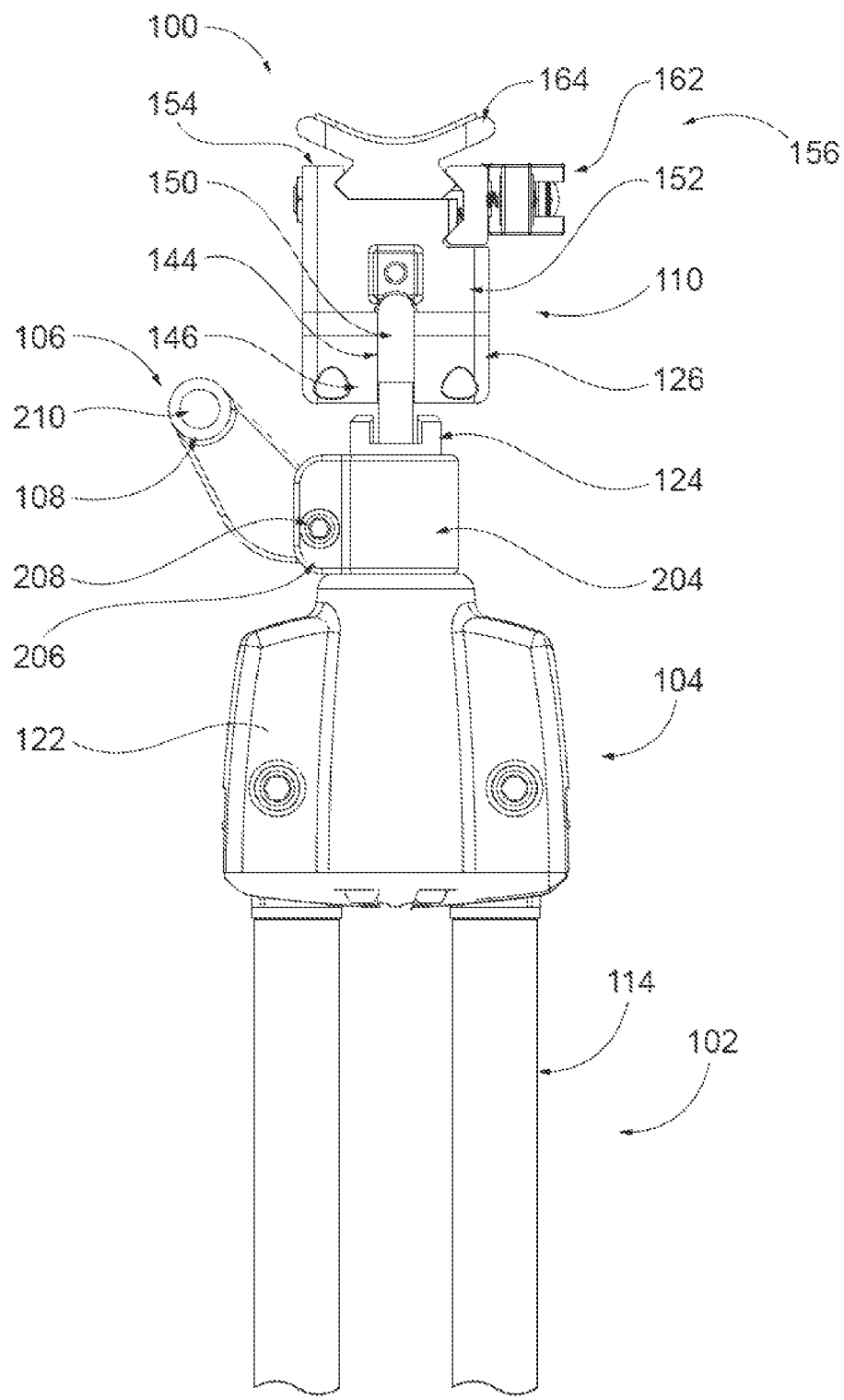
FIG. 3 is a rear view thereof.
Figure 4:
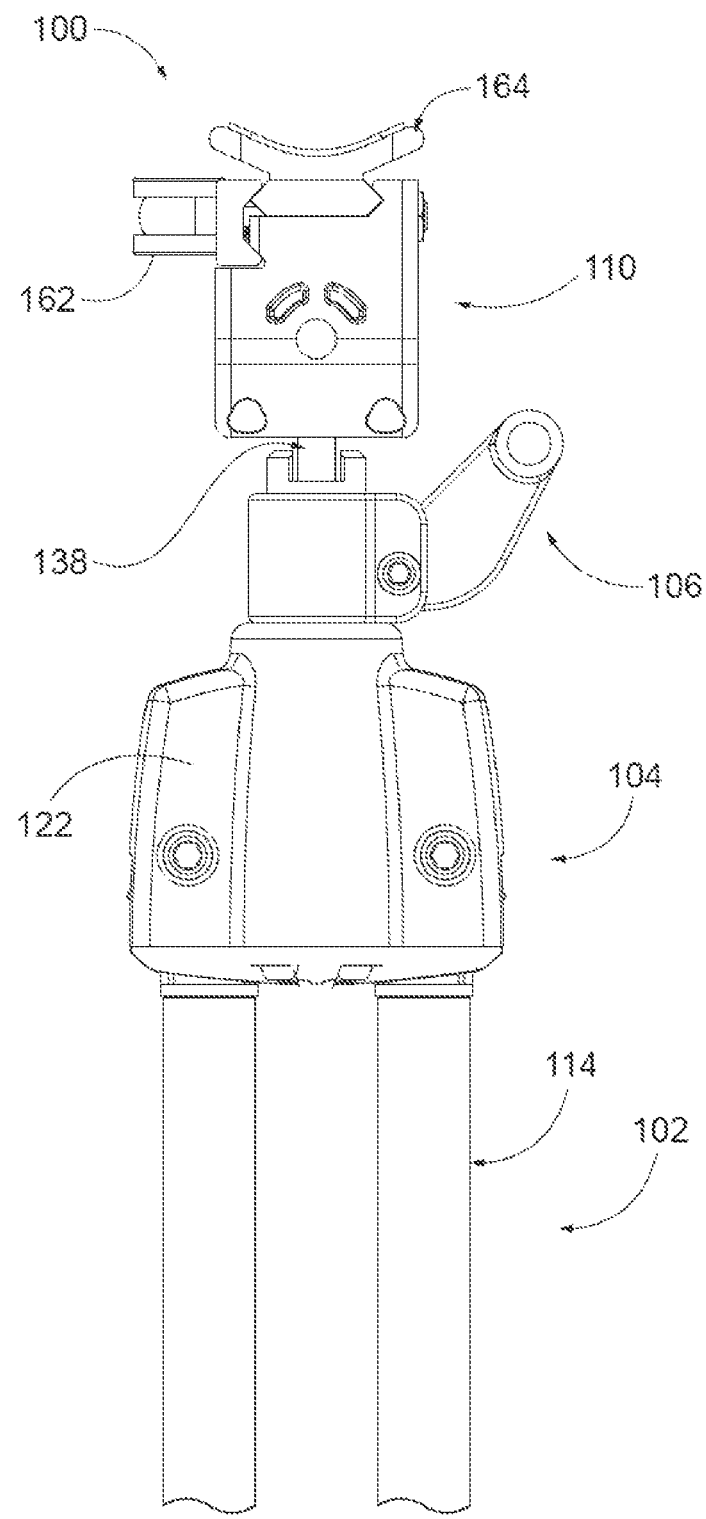
FIG. 4 is a front view thereof.
Figure 5:
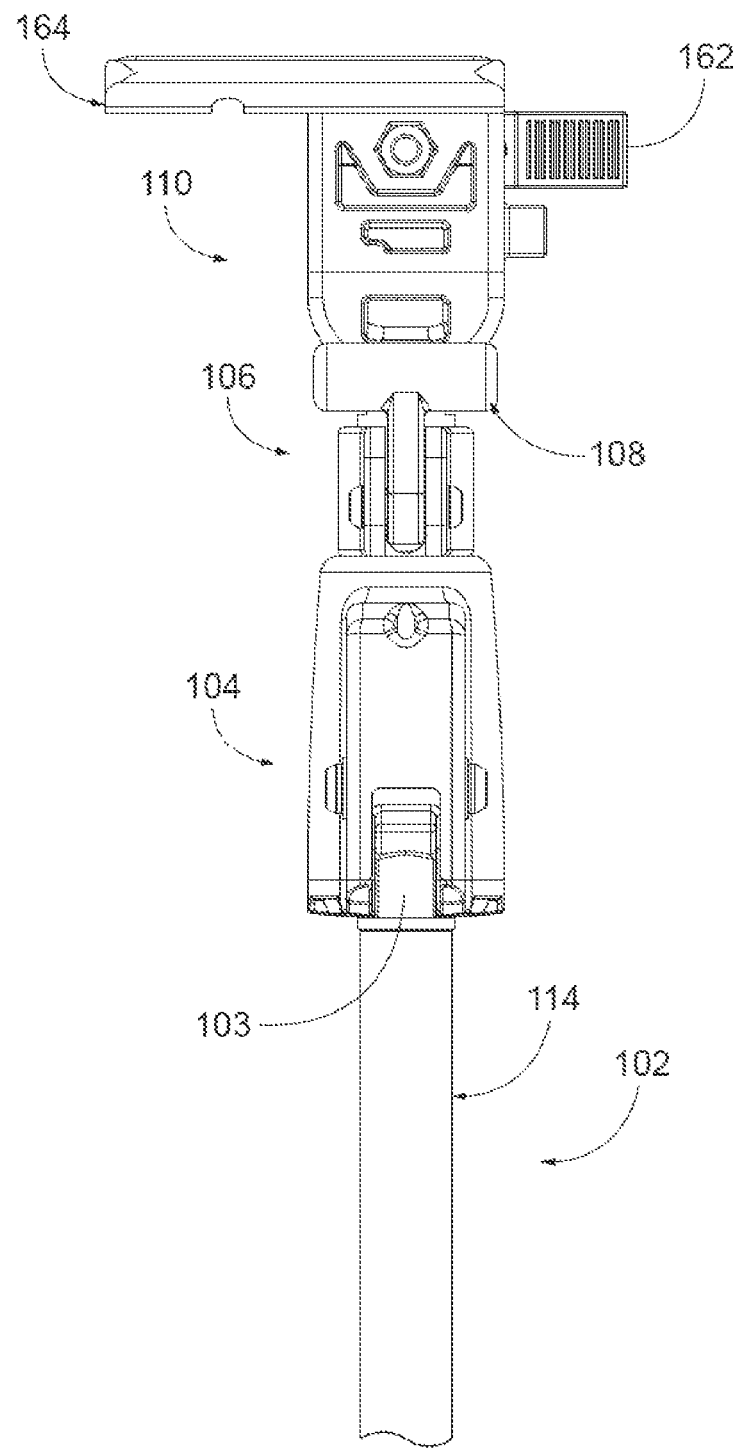
FIG. 5 is a left view thereof.
Figure 6:
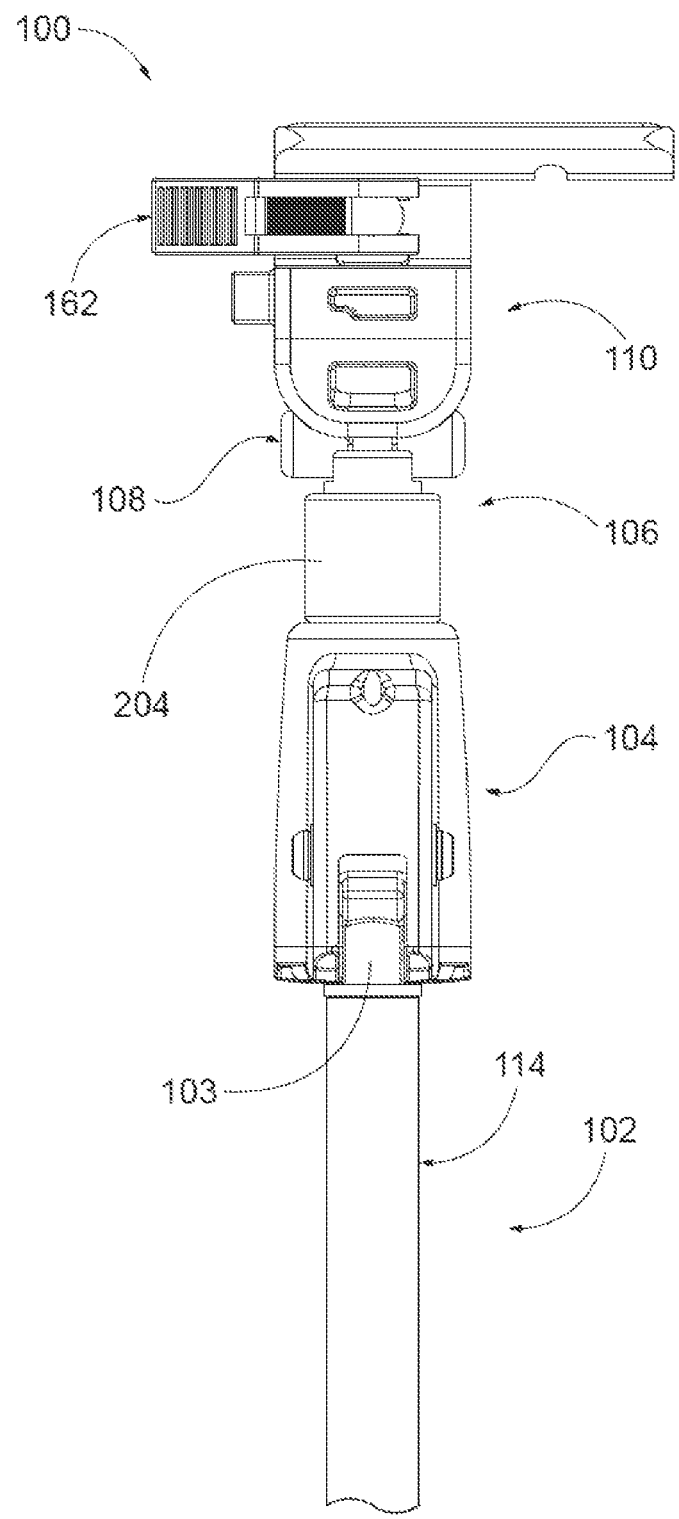
FIG. 6 is a right view thereof.
Figure 7:
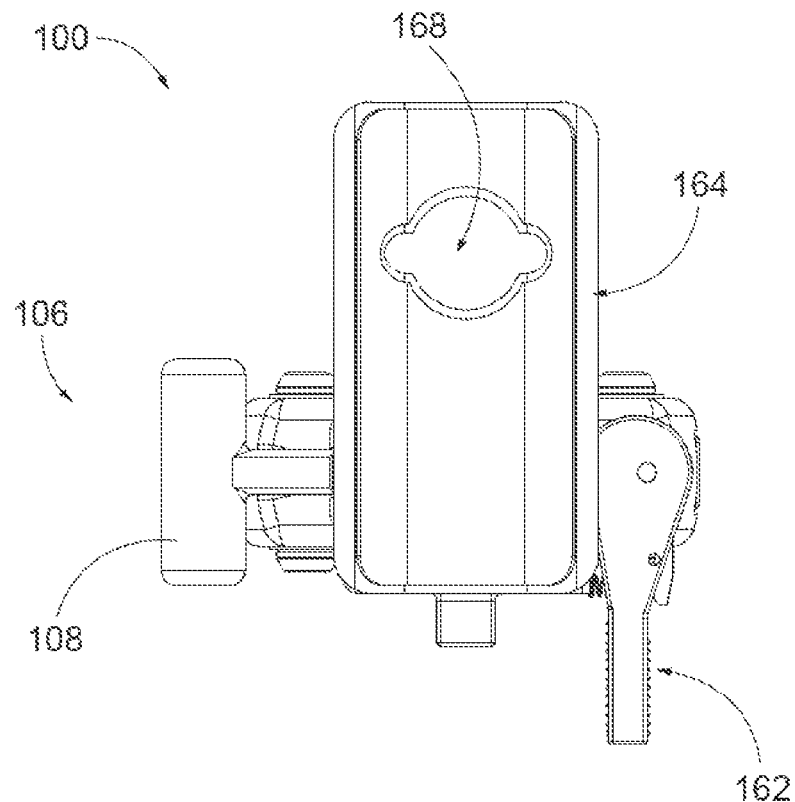
FIG. 7 is a top view thereof.
Figure 8:
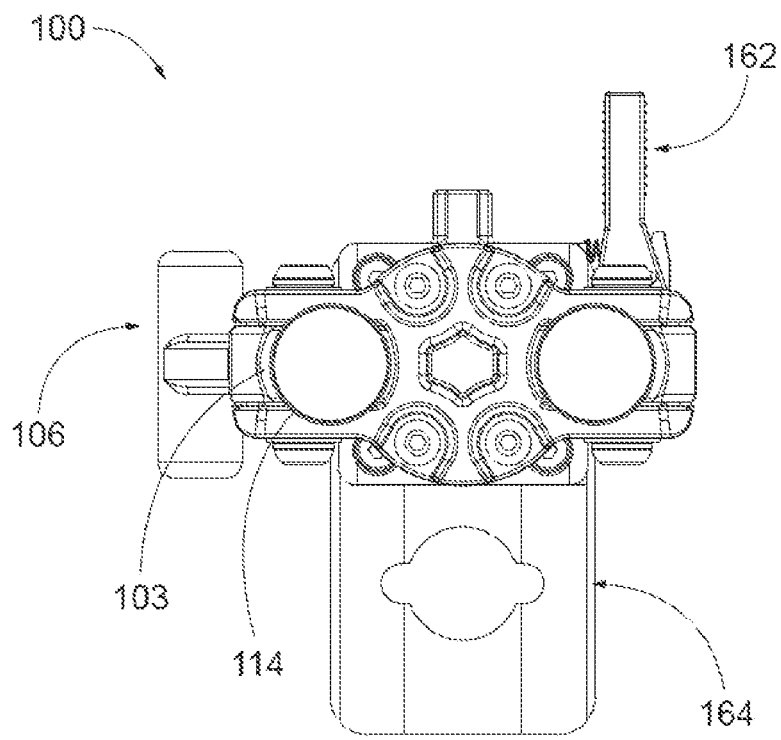
FIG. 8 is a bottom view thereof.
Figure 9:
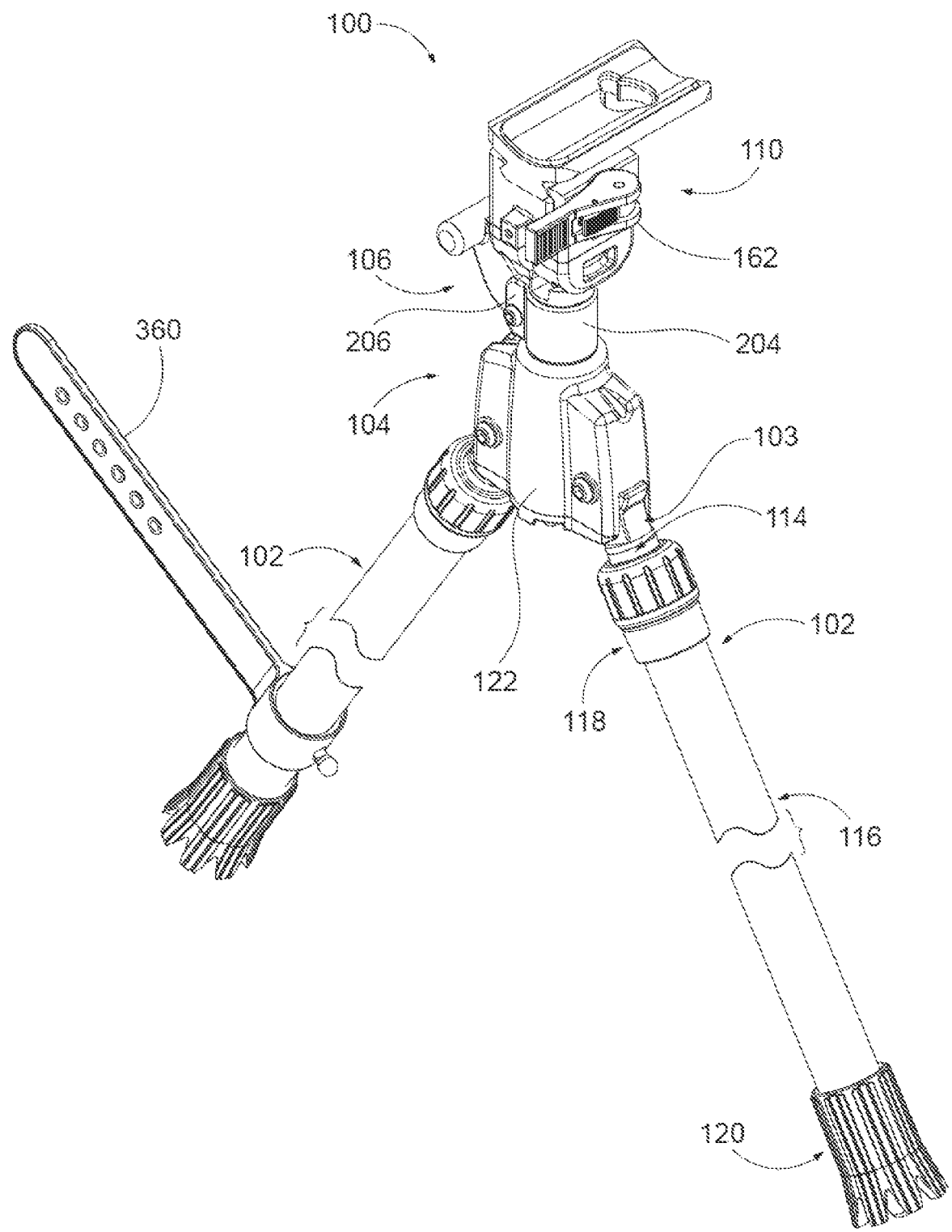
FIG. 9 detailed top rear perspective view of a gun-mounted telescoping support stand apparatus with legs in an open or spread position in accordance with embodiments of the disclosure.
Figure 10:
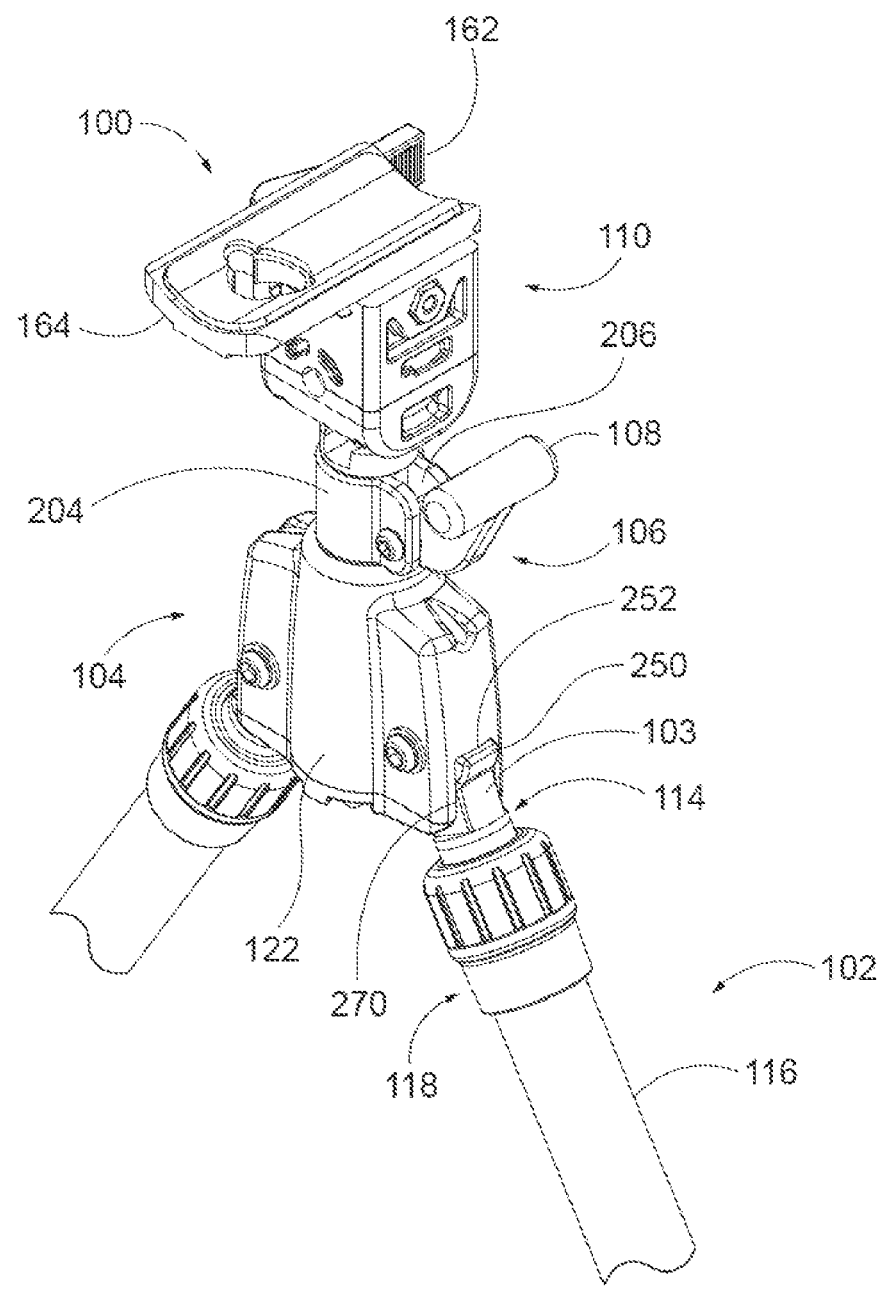
FIG. 10 is a detailed top front perspective view thereof.
Figure 11:
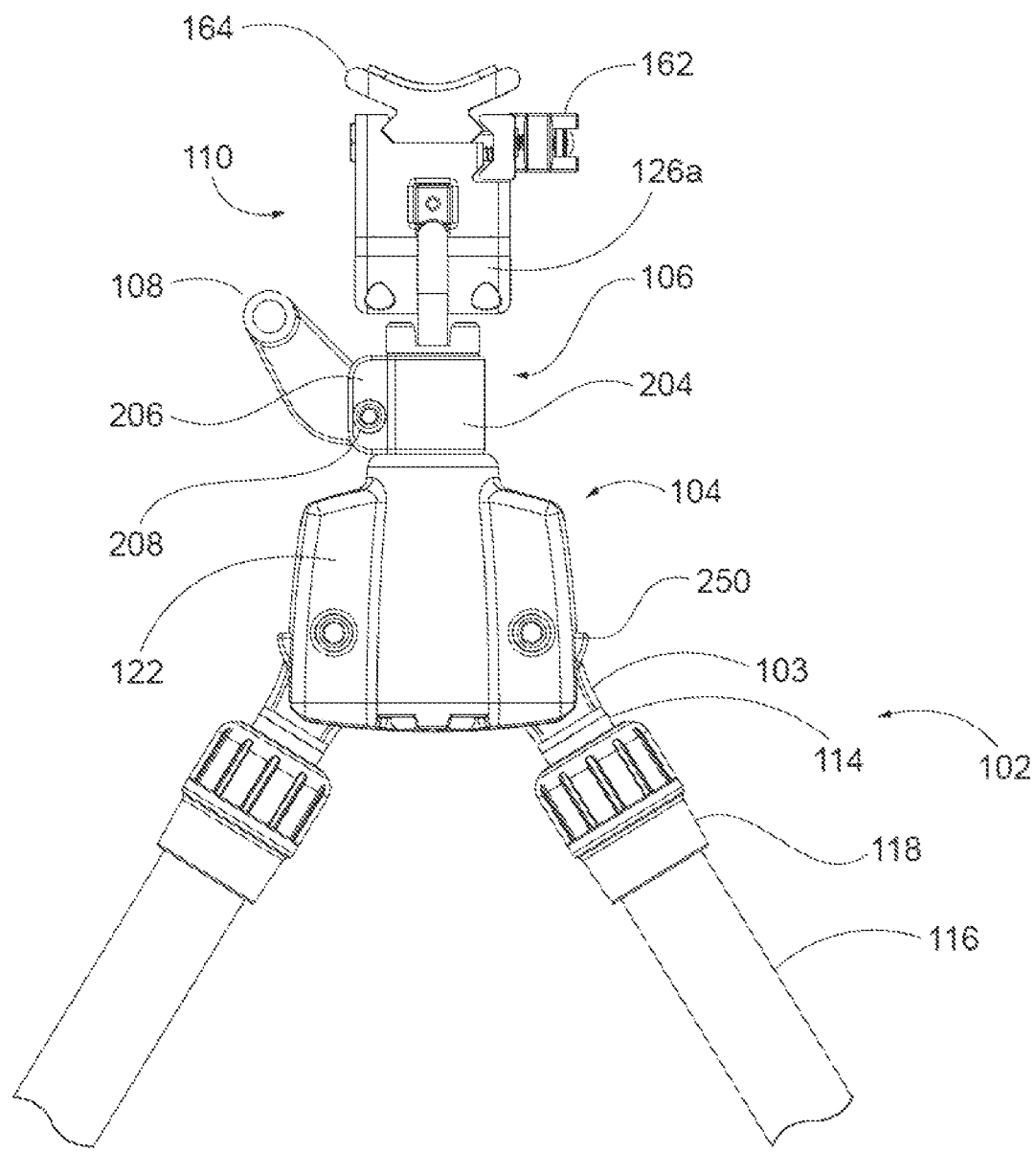
FIG. 11 is a rear view thereof.
Figure 12:
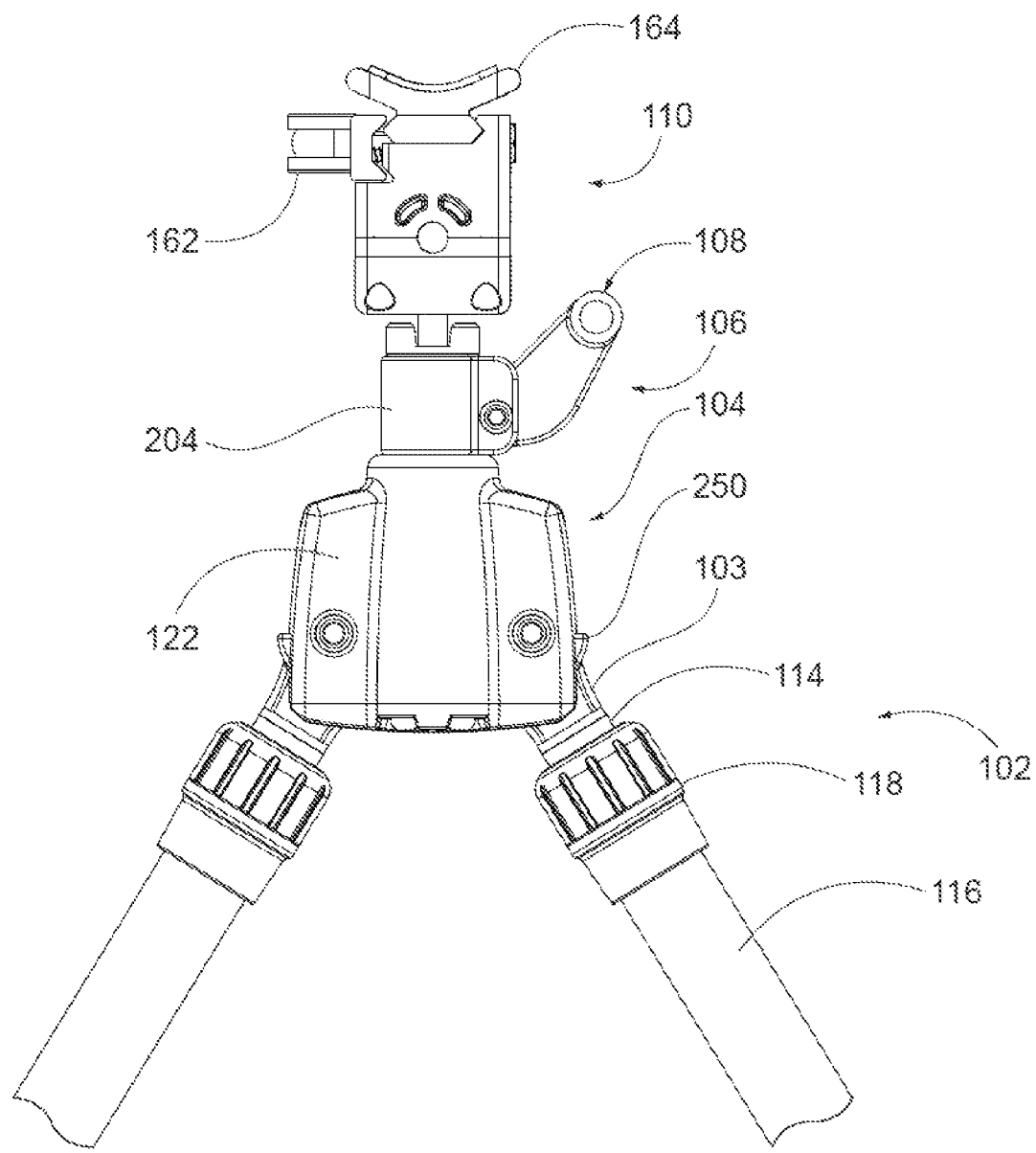
FIG. 12 is a front view thereof.
Figure 13:
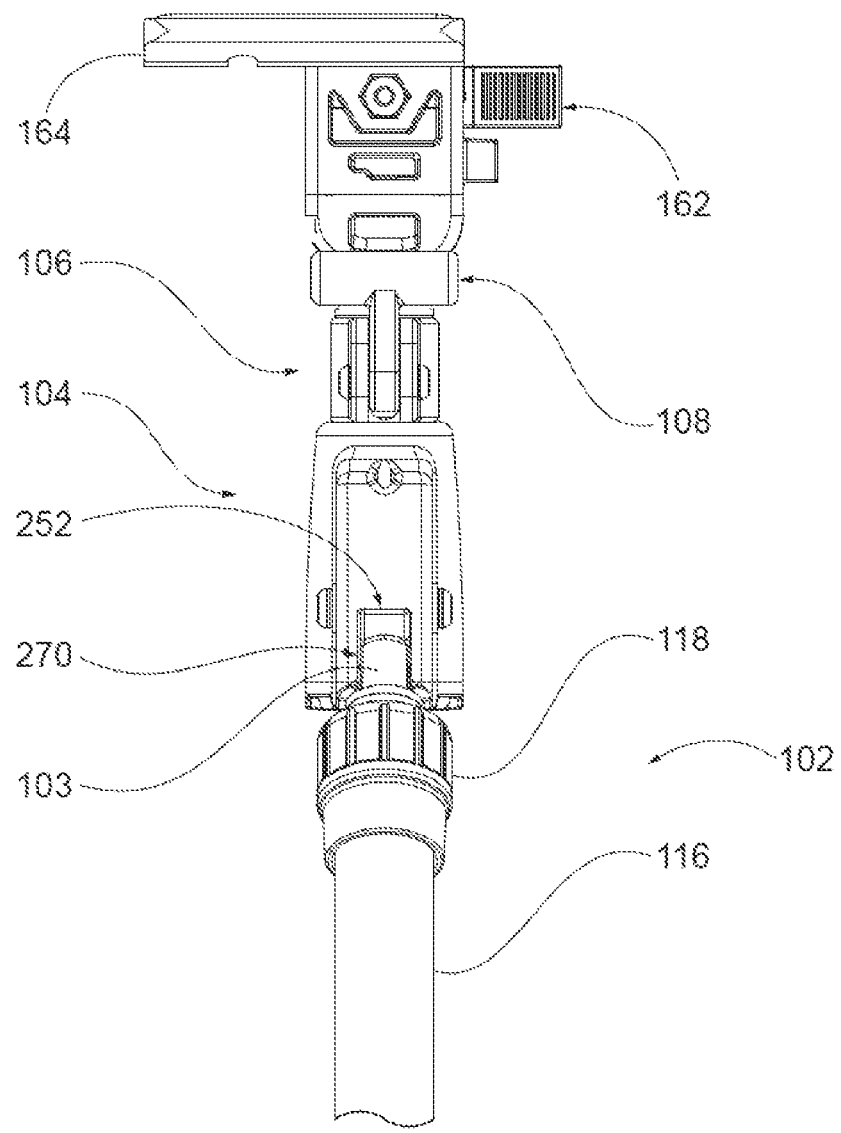
FIG. 13 is a left view thereof.
Figure 14:
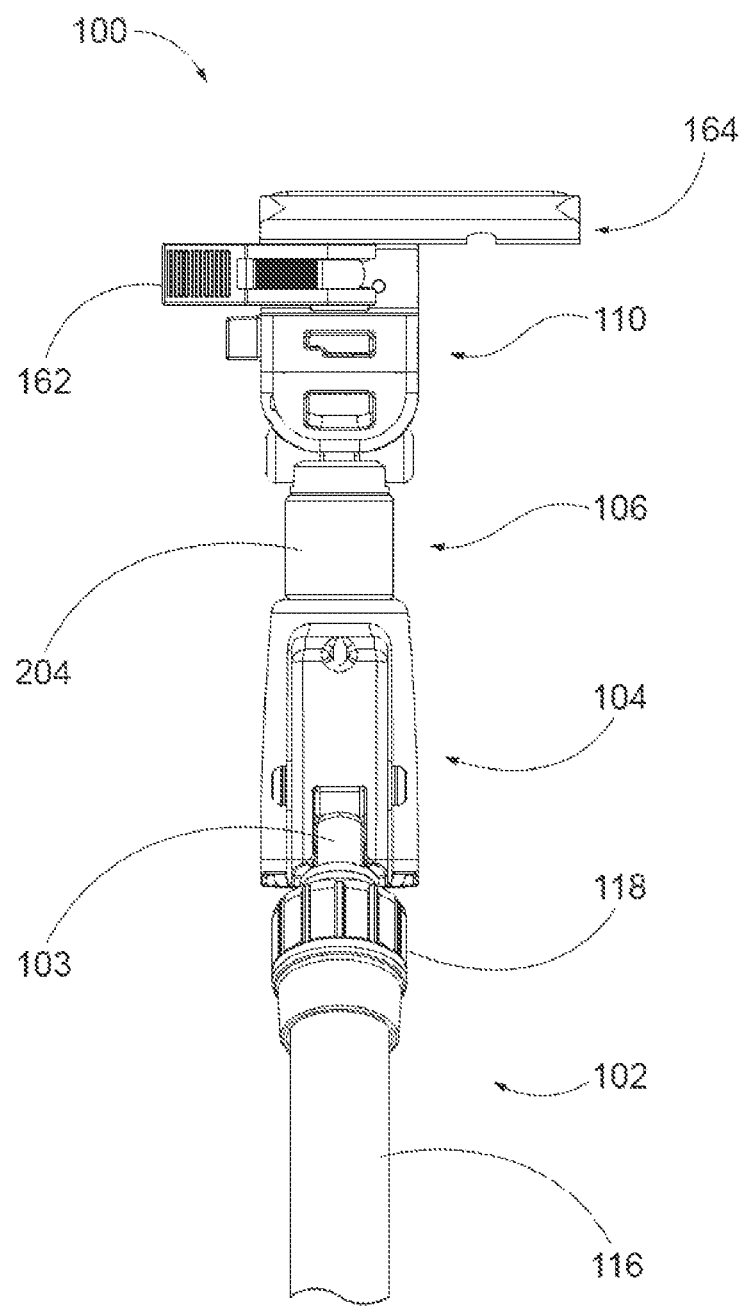
FIG. 14 is a right view thereof.
Figure 15:
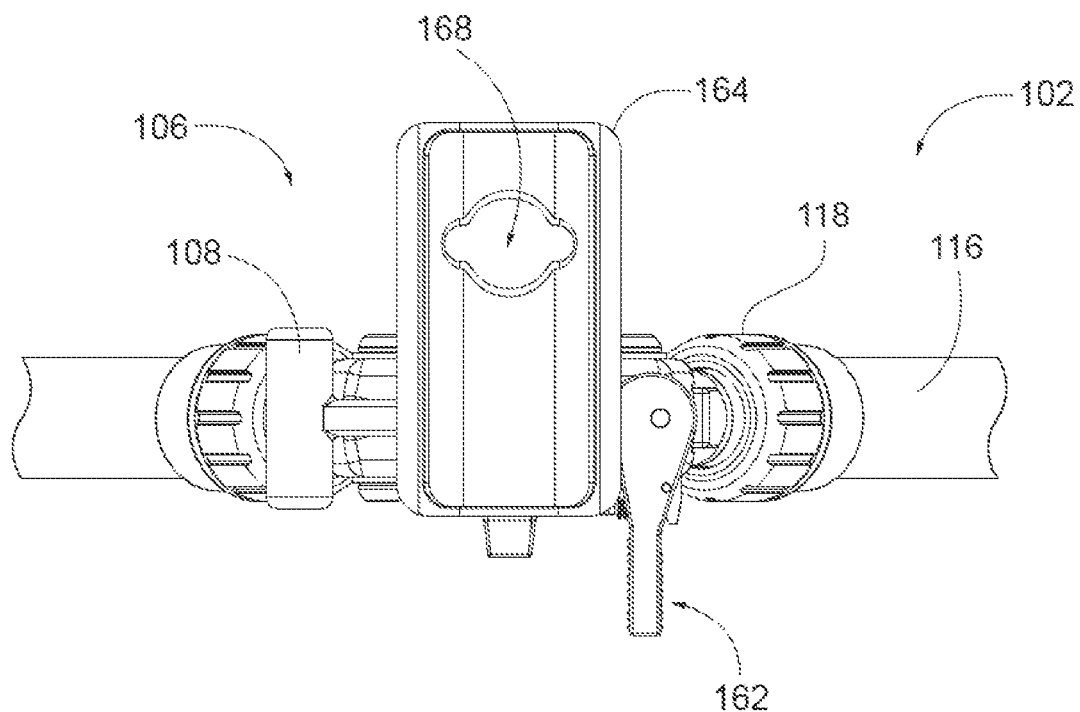
FIG. 15 is a top view thereof.
Figure 16:
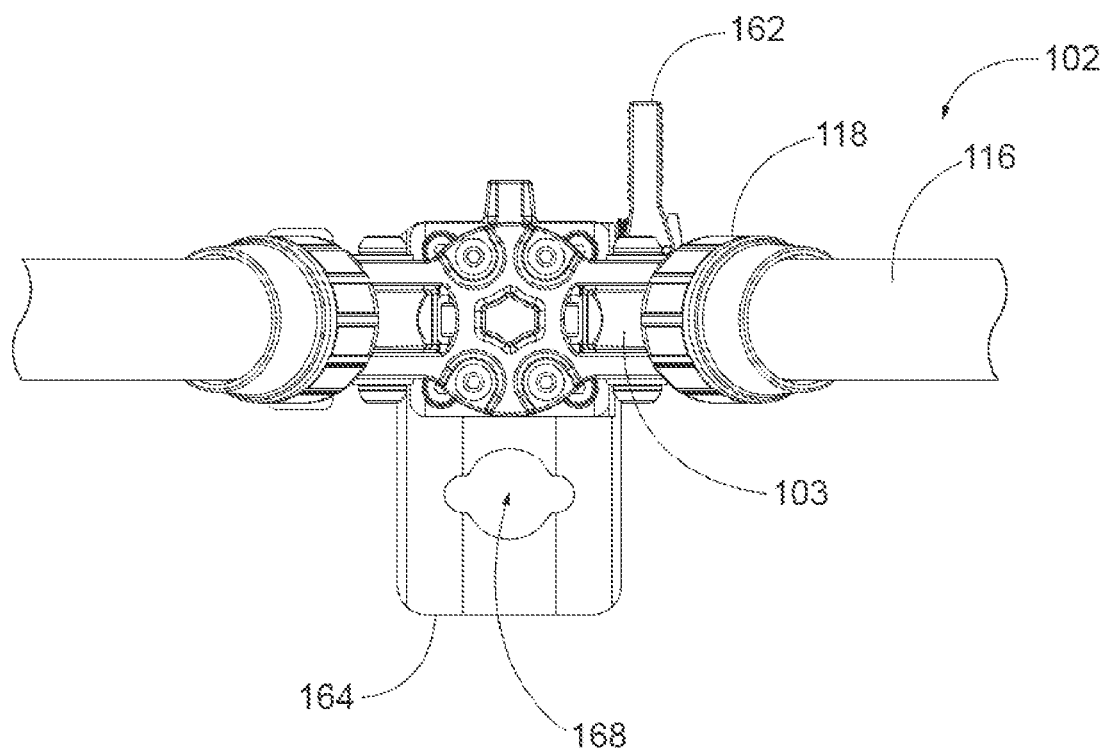
FIG. 16 is a bottom view thereof.

Referring to FIGS. 1-16, exemplary embodiments disclosed herein relate to an accessory or gun-mounted telescoping support stand apparatus. FIG. 1 illustrates a telescoping support stand 100 having extendable legs 102. In FIGS. 1-8, legs 102 are shown truncated for ease of presentation. The legs in these figures are shown in the closed configuration, such as for storing or transporting the stand. Legs 102 include inner tubes 114 and first end fittings 103 that are engaged to connection assembly 104. FIGS. 9-16 show the stand with legs 102 in an open or spread stance or position. Telescoping support stand 100 may have a connection assembly 104, a release mechanism or trigger assembly 106 including a trigger 108, an accessory mounting assembly 110, and two or more extendable legs 102. In the Figures, two extendable legs 102 are shown, but this is not limiting. As shown in FIG. 9, extendable legs 102 may each include an inner tube 114, an outer tube 116, a first end cap 118 attached to a top end of outer tube 116, a second end cap 120 attached to a bottom of outer tube 116, and optionally a strap 360 on one of the legs to hold the legs 102 together when in the closed position. Additionally, connection assembly 104 may comprise a connection housing 122. Trigger assembly 106 may also comprise a connection assembly tube 124 coupling connection assembly 104 to trigger assembly 106 (FIG. 3). In the embodiment, the two or more extendable legs 102 are connected to the connection assembly 104 and connection assembly tube 124 via end fittings 103. Connection assembly tube 124 is also connected at its upper end to an accessory mounting assembly 110. As shown in these Figures, an exemplary accessory mounting assembly 110 may comprise a Picatinny (or Weaver) rail adapter 164 and a locking lever 162.

According to some embodiments accessory mounting assembly 110 may be an accessory mounting assembly 110 configured to mount to the forward end of a weapon such as a rifle, crossbow, compressed-air gun, or other type of firearm or gun. Other accessory mounts may be used as described further herein.

Figure 17A:
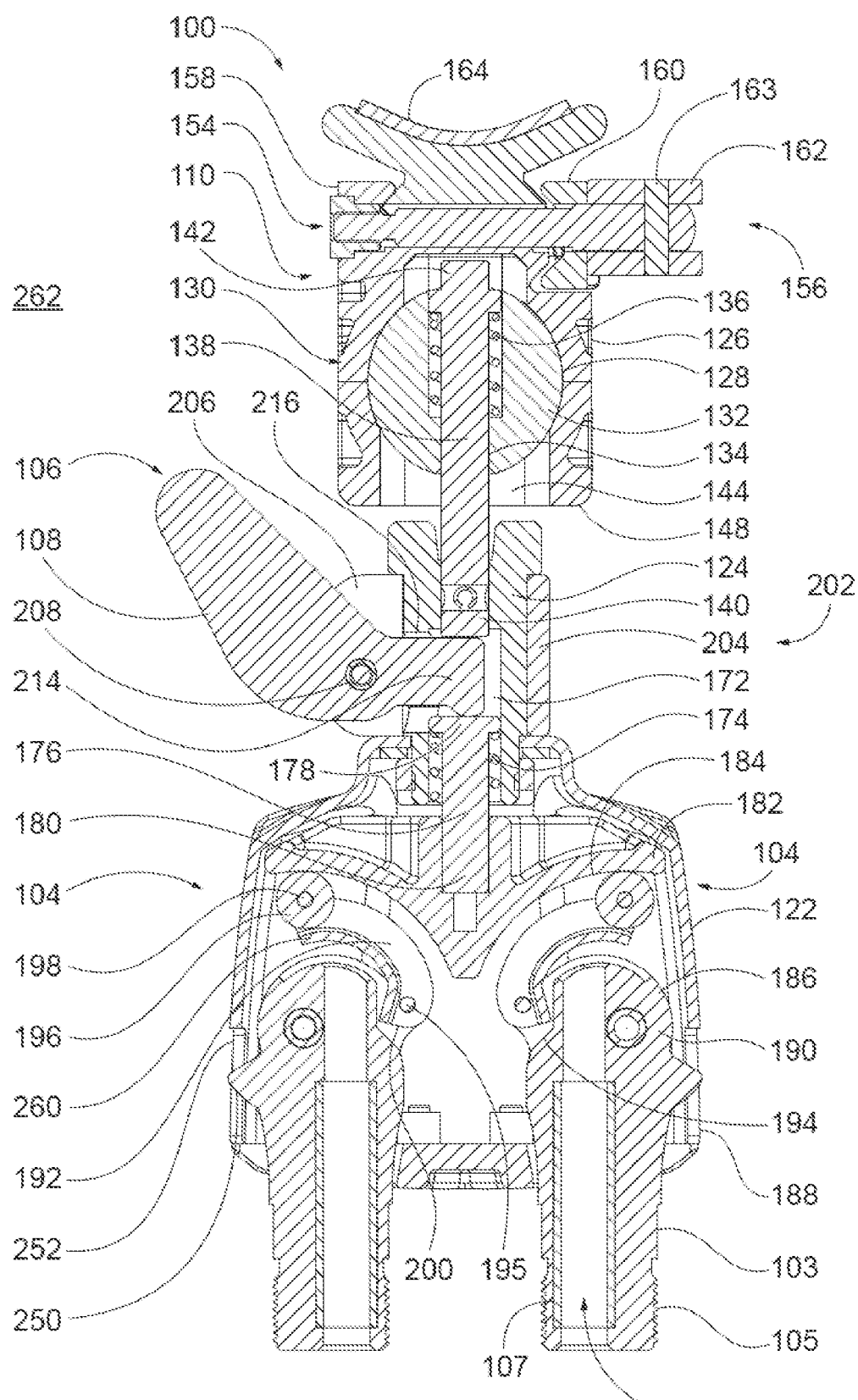
FIG. 17A is a cross-sectional view of the embodiment shown in FIGS. 1-8.
Figure 17B:
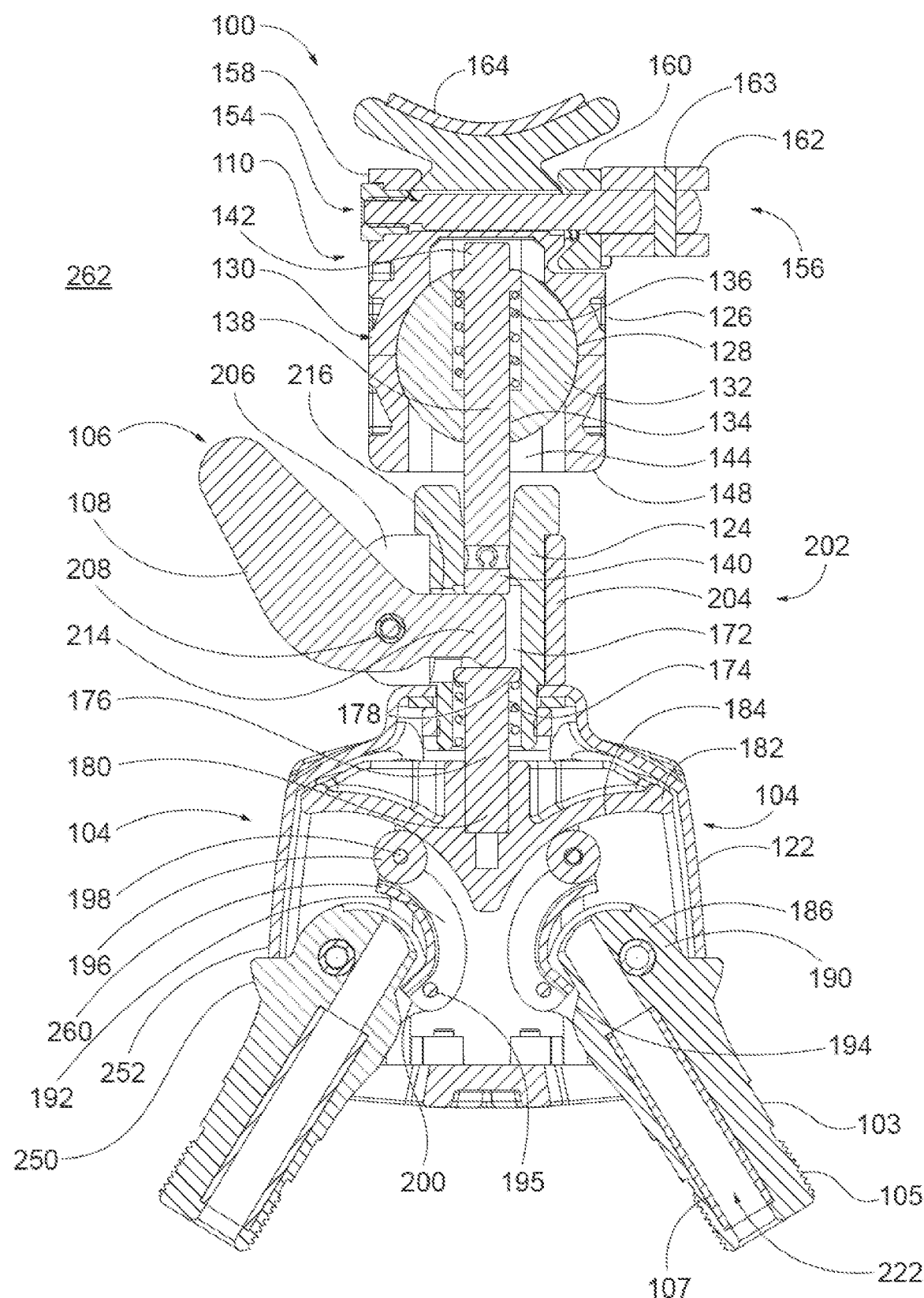
FIG. 17B is a cross-sectional view of the embodiment shown in FIGS. 9-16.
Figure 17C:
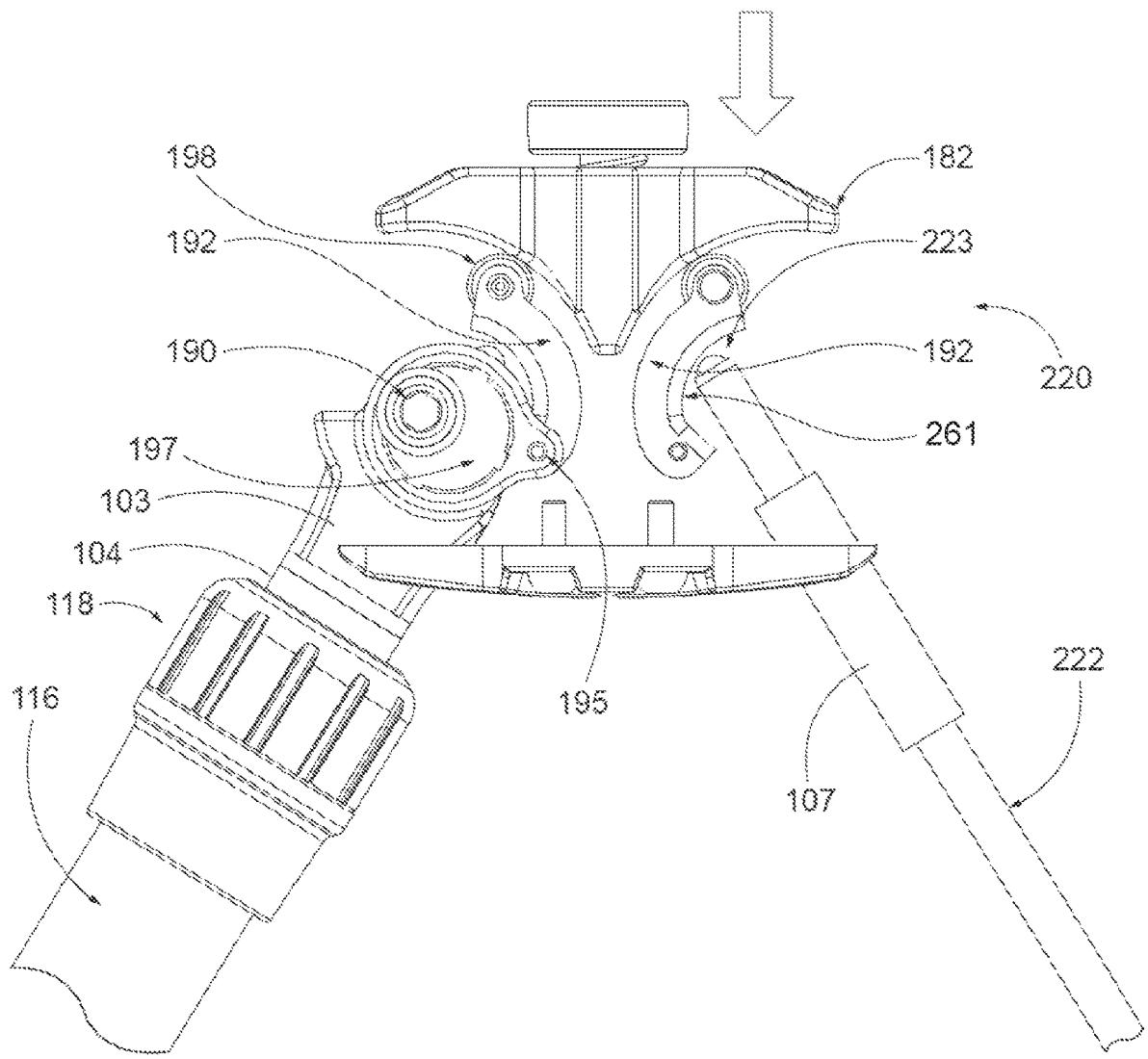
FIG. 17C is a partially disassembled view of the embodiment shown in FIGS. 9-16.
Figure 18:
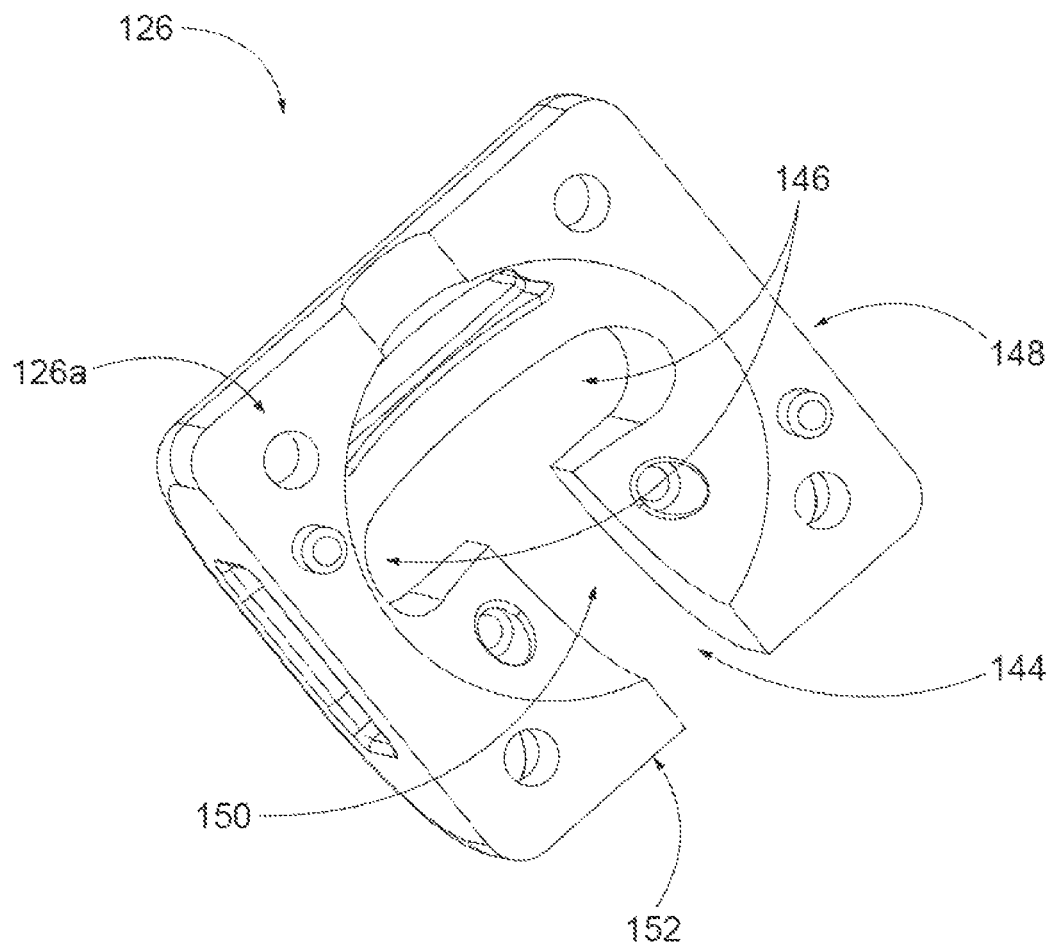
FIG. 18 shows a perspective view of a bottom of an accessory mount assembly in accordance with embodiments of the disclosure.

According to some embodiments, accessory mounting assembly 110 may be rotatable in several directions relative to connection assembly tube 124 for the telescoping support stand 100 to be folded up as a unit, including a connection assembly 104, a release mechanism or trigger assembly 106, and extendable legs 102, parallel to the weapon axis. FIGS. 17A-C shows a cross-section of an exemplary bipod (two-legged) support stand on a plane 262 defined by the extendable legs 102. As shown in FIG. 17A, in various embodiments, accessory mounting assembly 110 includes an accessory mounting assembly housing 126 having an internal socket 128 and a ball joint 130 comprising a ball 132 housed within the internal socket 128. Ball 132 includes a bore 134 extending through ball 132. A helical spring 136 is disposed within bore 134. A ball joint rod 138 is disposed within the helical spring 136 within bore 134. Ball joint rod 138 may be configured for biased movement relative to bore 134. Ball joint rod 138 has a lower end 140 which extends beyond the lower end of bore 134 and is fixed to an upper end of connection assembly tube 124. Ball joint rod 138 has an upper end 142 having a greater diameter than bore 134 such that upper end 142 is configured to be blocked from passing through bore 134. In some embodiments as shown in FIG. 18, a lower portion 126a of the accessory mounting assembly housing 126 has a curved T-shaped slot 144 extending along two sides such that the cross legs 146 of the T-shaped slot 144 extends across a bottom 148 of the accessory mounting assembly housing 126 and the center leg 150 of T-shaped slot 144 extend along a side 152 of the accessory mounting assembly housing 126. To rotate the accessory mounting assembly 110 relative to connection assembly 104, a user pulls up on the accessory mounting assembly 110 relative to connection assembly 104 which compresses spring 136 within bore 134 allowing movement of accessory mounting assembly 110 by rotating about the axis of ball joint rod 138 and/or allowing ball joint rod 138 to follow the path of T-shaped slot 144.

In other embodiments (not shown), the accessory mounting assembly housing 126 may have a spring loaded-pin that contacts a ball 132 to hold it in place. To rotate the accessory mounting assembly, a user may pull the spring-loaded pin away from the ball so that it is free to rotate within the internal socket 128 and then release the spring loaded pin to contact the ball 132 to hold it in its new position.

According to some embodiments, the top 154 of accessory mounting assembly 110 includes a weapon or gun mount 156 which is configured to mount to a gun, for example. Gun mount 156 may be configured to mount to a swivel stud or a Picatinny rail or Weaver rail attached to the gun. In some embodiments, gun mount 156 includes a fixed rail 158 and a spaced parallel movable rail 160 which is movable toward and away from fixed rail 158 in order to clamp onto a gun's Picatinny rail. Movable rail 160 may have a locking lever 162 pivotally attached thereto to lock the position of movable rail 160 relative to fixed rail 158 by pivot connection 163.

Figure 19:
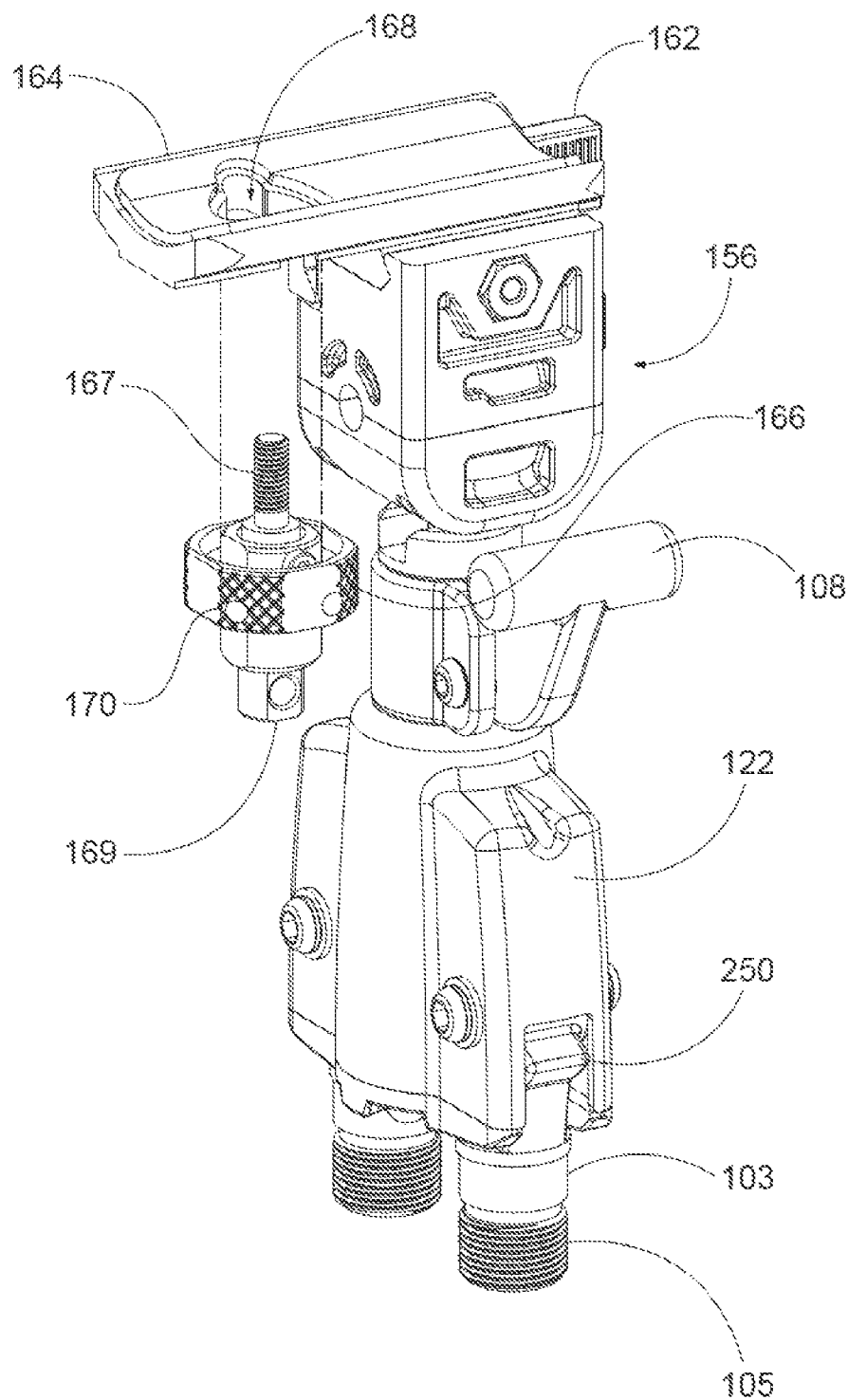
FIG. 19 is a is a detailed top front perspective view of a gun-mounted telescoping support stand apparatus in accordance with embodiments of the disclosure.

According to some embodiments, when a gun does not have a Picatinny rail, a Picatinny rail adapter 164 may be mounted to the gun mount 156 rails 158, 160 to mount a weapon using a threaded locking nut 966 (FIG. 19). In some embodiments, Picatinny rail adapter 164 may be a V-shaped or U-shaped trough and have a through hole 168 for mounting to a swivel stud on the gun with the locking nut 166, which may include radial through holes 170 configured to receive set screws to clamp on to the swivel stud comprising threaded rod 167 on the gun. Rod 167 is not normally removed from the gun but is shown here removed from the gun to allow ease of presentation. Nut 166 is configured to engage rod 167 from below when the swivel stud is passed through hole 168 from above. Alternatively as shown, the nut may be engaged to a threaded rod 167 that can engage an internally threaded socket on the underside of an accessory to attach the accessory (e.g. a weapon) to the mount. Nut 166 also comprises a post with a transverse through hole 169. Gun mount 156 may be shaped to allow a shooter to support the forward end of the weapon or gun, for example, while the shooter is shooting and to continue to attach to the gun when not in use.

It should be appreciated that the accessory mounting assembly 110 may comprise an accessory mount other than mount 156 illustrated herein. In embodiments, the mounting assembly comprises an alternative mount other than mount 156 attached to the top 156 of the mounting assembly comprising the ball and socket assembly described above by engaging the alternative mount to ball joint rod 138 at its upper end 142.

As shown in cross-sectional view FIG. 17A, connection assembly tube 124 may further include an axial bore 172 extending through connection assembly tube 124. A helical spring 174 may be disposed within axial bore 172. A displacement rod 176 may be disposed within the helical spring 174 within axial bore 172. Displacement rod 176 is configured for biased movement relative to axial bore 172. Displacement rod 176 has an upper end 178 configured to engage with trigger 108 as discussed below. A displacement member 182 is coupled to a lower end 180 of displacement rod 176 and may be configured to have two curved ramp surfaces 184 to engage upper ends of two extendable legs 102 as shown in the Figures. The curved ramp surface is configured to engage the upper ends of the plurality of legs 102.

Joint members 186 may be disposed on and/or within an end portion of at least one of extendable legs 102. In the embodiment shown in FIG. 17A, extendable legs 102 comprise first end fittings 103, including joint members 186 that may also be positioned at least partially within a connection assembly housing 188 of connection assembly 104, coupling extendable legs 102 to connection housing 104 by pivot connections 190. First end fittings 103 also comprise screw threads 105 at their lower ends configured to engage complementary screw threads on the inside surface of inner tubes 114 (not shown in this figure). A pair of curved actuation members 192 may also be rollably coupled to roller wheel 198 by coupling pin 196 at first ends 260 thereof. Each roller wheel 198 is configured to rollably traverse curved ramp surface 184, either towards or away from a vertical axis of the support stand 100 that passes through axial bore 172 as extendable legs 102 hingeably extend or retract towards or away from the vertical axis, thereby widening or narrowing the stance of the bi-pod support stand 100. Each curved actuation member 192 pivotally attaches to an upper portion of extendable leg 102 at a second end 200 distal from first end 260. Each actuation member 192 is configured to follow along a respective curved ramp surface 184 (via rollable wheel 198) of displacement member 182 when extendable legs 102 angularly rotate to extend or retract from the vertical axis of the support stand 100. Each joint member 186 may have angled engagements surfaces 194 configured to engage second end 200 of a respective actuation member 192. A user may move manually each of the extendable legs independently from each other outward into an open stance. As extendable legs 102 move outwardly, placing the support stand 100 into the open stance, engagement surface 194 imparts a force into second end 200 thereby causing the curved actuation member 192 to follow along the ramp surface accordingly. In some embodiments, a nub member 250 is configured to meet stop surface 252 to limit the range of the angular rotation of extendable legs.

As shown in FIG. 17A, trigger assembly 106 may further comprise a trigger assembly housing 202 which may be in the form of a tubular clamp 204 having opposed flanges 206. Tubular clamp 204 is configured to clamp around connection assembly tube 124 such that flanges 206 are arranged on one side of telescoping support stand 100. Trigger 108 may be pivotally mounted between flanges 206 at pivot connection 208 such that trigger assembly is configured to pivot about a pivot axis which runs parallel to a side of telescoping support stand 100 wherein the extendable legs 102 define a plane 262 and the trigger pivot axis is substantially perpendicular to the plane. Trigger 102 is configured to pivot about the trigger pivot axis such that it remains within the plane defined by the extendable legs or a plane 262 parallel thereto. This allows the trigger 102 to be easily reachable by a user's hand when the support stand is mounted to an end of, e.g., a rifle, such that a trigger placement that is distal to the user in a plane perpendicular to the plane 262 defined by extendable legs 102 may be difficult for a user to reliably and comfortably reach when, e.g., the rifle is shouldered for taking aim.

Trigger 108 has an upwardly angled user actuated end 210 and a contact end 214 at the opposite end thereto. Connection assembly tube 124 further has a radial bore 216 through which trigger 108 may be disposed such that contact end 214 is disposed within connection assembly tube 124 and is configured to engage upper end 178 of displacement rod 176 within axial bore 172. As user actuated end 210 is pulled toward connection assembly tube 124, contact end 124 of trigger 108 may contact and cause displacement rod 176 to slide in a longitudinal direction within axial bore 172, compressing spring 174. As shown in FIG. 17A, displacement rod 176 slides in a direction substantially parallel to a length dimension of the connection assembly tube 124. As further shown in FIG. 17A, displacement rod 176 may be coupled to displacement member 182, and additionally, displacement member 182 may be adjacent to curved actuation members 192. Accordingly, displacement rod 176 may cause displacement member 182 to displace, causing curved actuation members 192 to pivot about pivots 195 causing second ends of curved actuating members 200 to disengage from angled engagement surfaces 194 of joint member 186 to release extendable legs 102 to allow them to pivot about pivot connections 190.

FIG. 17B shows a cross-section similar to FIG. 17A, except the legs are disposed in their extended positions. In this view, it can be seen that the legs are rotated outward and roller wheels 196 have moved downward and toward the center of the connection housing and. Nub 250 travels within slot 270 and engages the housing at edge 252 (see FIGS. 1, 10 and 13), preventing further outward movement of the legs.

FIG. 17C shows a partially disassembled view of the connection assembly with the housing removed to show the internal mechanism. As shown, the left leg 102a is engaged to the actuation mechanism via rotation disk 197, which is eccentrically mounted on pivot point 190, and connected to pivot point 195 at extension 199 near its edge. Outward movement of the leg 102a around pivot point 190 moves the top end 103 of leg 102a outward into its open stance. This in turn rotates rotation disk 197 to move pivot point 195 downward and to the right and causes roller wheel 198 to travel along surface 184. The curved actuation member 192 is also moved into the position shown. Right leg 102b is further disassembled to show release rod 222. Release rod 222 comprises an upper tip 223 configured to engage and travel along a flange 261 on curved actuation member 192 and move longitudinally within release rod guide tube 107 within 103 (see FIGS. 17A and 17B). Tip 223 may comprise a ball bearing (shown) or roller bearing. Using the mechanism described above, the curved actuation member is positioned to be adjacent to the upper tip 223 no matter how the legs are oriented, without exerting undue pressure on the release rod tip 223.

When the trigger is operated, downward movement of displacement member 182 causes actuation member 192 to move downward and contact the release rod tip with sufficient force to cause release rod 222 to move downward within leg 102b to release locking mechanism 470 as discussed further below. When the trigger is released, the displacement member is moved upward by decompression of spring 174, providing space for the release rod 222 to move upward within leg 102b. As discussed below with regard to FIGS. 21A-C, upward movement of release rod 222 results from decompression of spring 479 in the locking mechanism 470.

Figure 20:
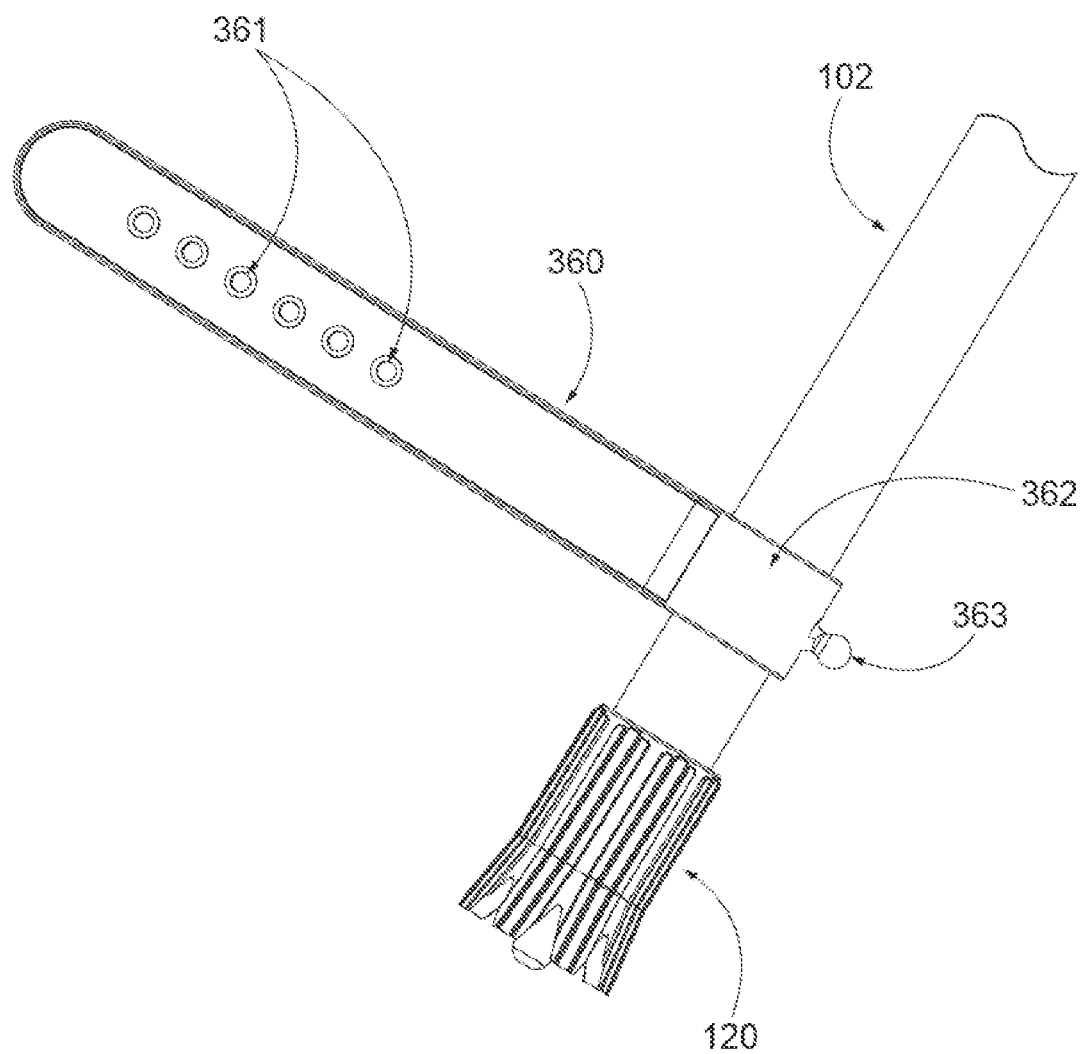
FIG. 20 is a close-up view of the bottom of a leg of a gun-mounted telescoping support stand apparatus in accordance with embodiments of the disclosure.

FIG. 20 shows a close-up view of an end of one of the legs comprising an optional strap configured to wrap around the lower ends of the legs of the stand when they are in a closed configuration. Strap 360, comprising one or a plurality of holes 361 can be disposed at the lower end of one of the legs 102. Collar 362 can be disposed around leg 102 to position the strap. Projection 363 on collar 362 is configured to releasably engage one of the holes 361 on the strap 360. In some embodiments, collar 363 and foot pad 64 are separate members as shown; in other embodiments (not shown) collar 363 may be integrated with a foot pad 120. In embodiments, strap 360 may comprise an elastomeric material. Alternatively, the strap may have other closure types such as complementary hook and loop segments, or magnet (s) and ferrous material, on the strap 360 and collar 362.

Telescoping support stand 100 may further include a locking mechanism 470 mounted to release assembly 220 configured to release the locking mechanism 470 and allow the outer tube 116 and the inner tube 114 to move relative to each other. According to certain embodiments, the locking mechanism 470 may be configured at the lower end of inner tube 114. The locking mechanism 470 may be capable of releasably securing inner tube 114 to outer tube 116 by pressing against an inside surface of outer tube 116.

In the exemplary embodiment shown, the release assembly may comprise displacement member 182 in contact with a release rod 222 coupled to the locking mechanism 470. Displacement rod 176 is operable to actuate the displacement member 182 to move the release rod 222, the release rod 222 releasing the locking mechanism 470 to allow relative movement between the inner and outer tubes 114, 116. In certain embodiments, locking mechanism 470 and release rod 222 may be configured as or similar to locking mechanism 870 and release rod 860 of U.S. Pat. No. 9,010,710, incorporated by reference herein.

Figure 21A:
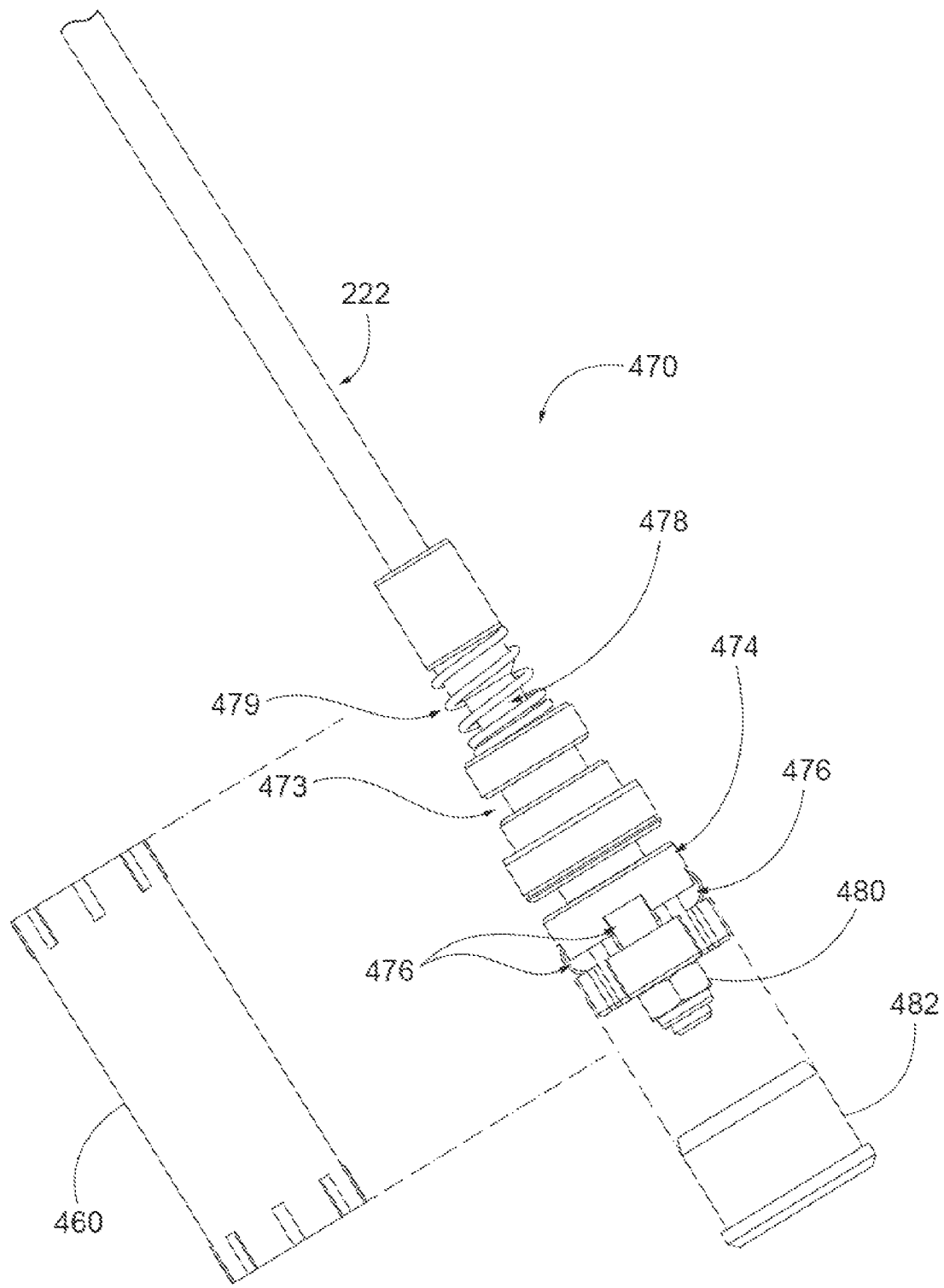
FIGS. 21A-21C show aspects of a release mechanism in accordance with embodiments of the disclosure.

FIG. 21A shows a partially disassembled locking mechanism 470 that is disposed within and connected to the lower end of inner tube 114 (not shown). Release rod 222 is in operational connectivity to a tubular plunger 478. Plunger 478 may be a cylinder with an opening through the middle at its upper end. As shown in FIG. 21C, the opening may receive rod 222. In some embodiments, tubular member 478 may be attached to release rod 222 so that tubular member 478 will move when rod 222 moves. Collar 473 is attached to the bottom of inner tube 114 and is slidably engaged around plunger 478. A helical spring 479 is disposed around plunger 478 and engaged at its upper end to the wider upper end of plunger 478. The lower end of spring 479 is engaged to the upper end of collar 473. A bearing retainer comprising a plurality of bearings 476 circumferentially disposed around bearing retainer is attached to the bottom of plunger 478 with nut 480. Nut 480 may be in contact with an inner plug 482 configured to engage the bottom inside surface of outer tube 116, comprising one or more air passages 484 (see FIG. 21C). Jacket 460 may be disposed around the locking mechanism 470 between inner tube 114 and outer tube 116 to enclose the mechanism and provide separation between tubes 114 and 116 to reduce contact along their lengths.

Figure 21B:
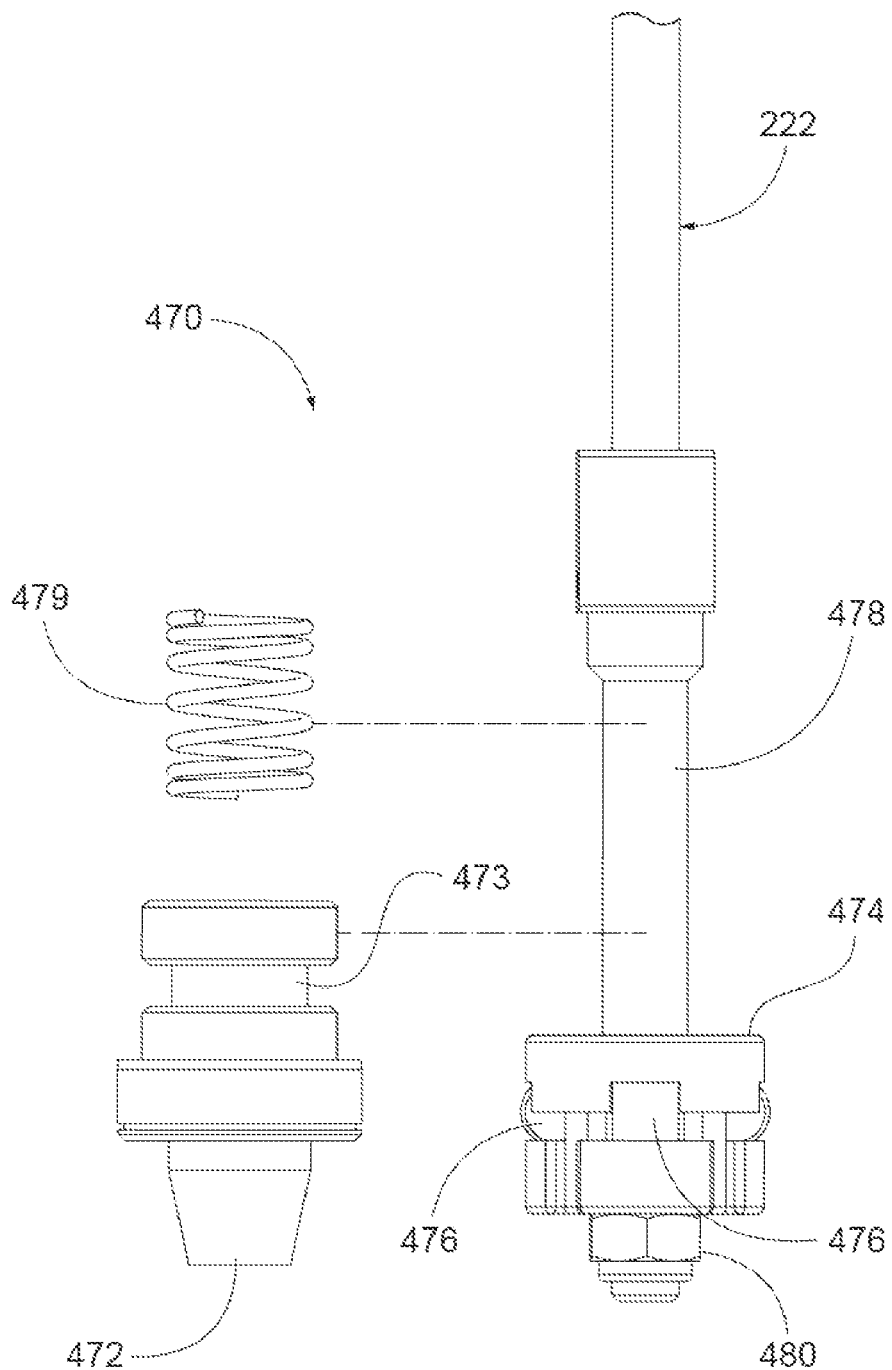
Figure 21C:
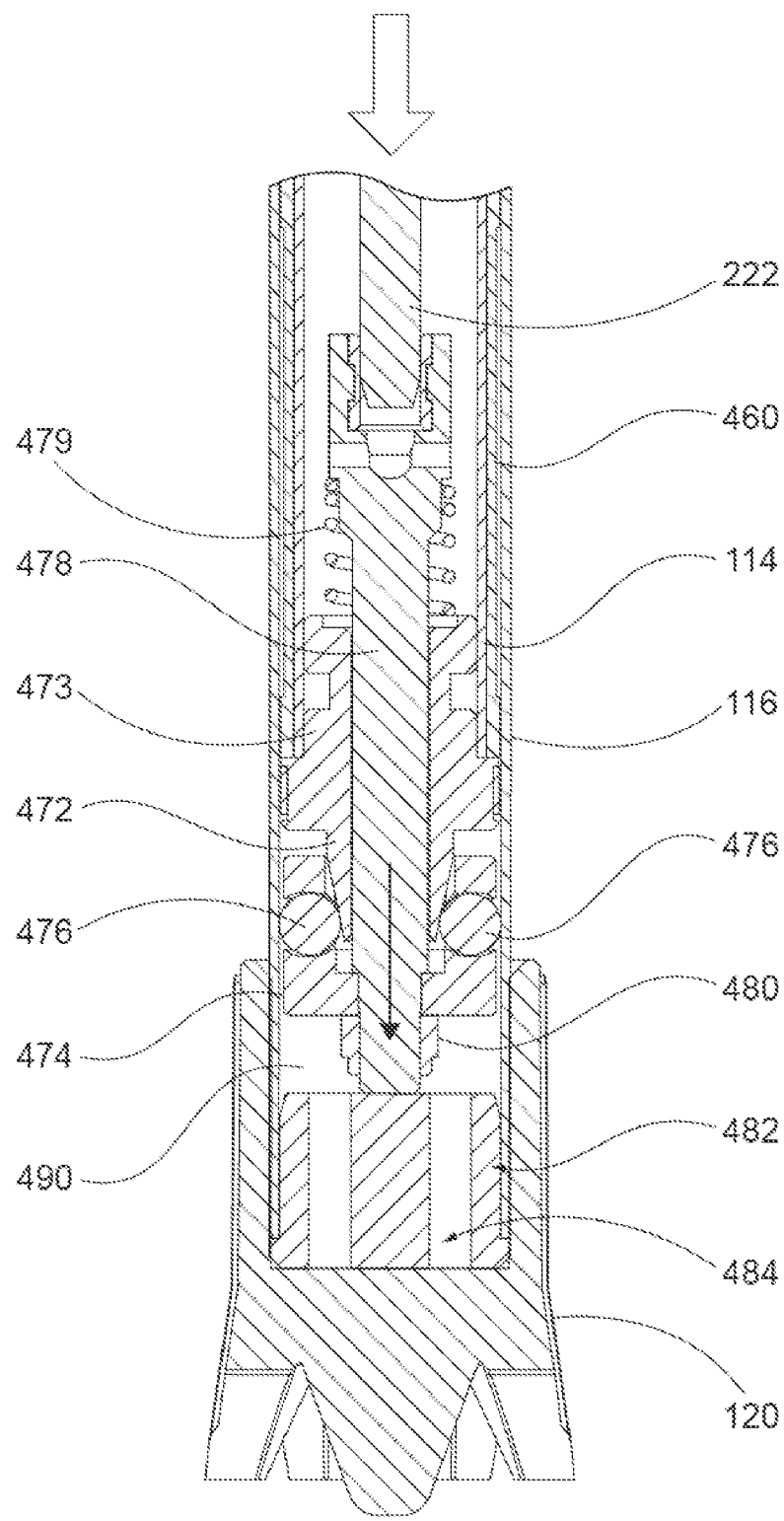

FIG. 21B illustrates an exploded view of exemplary locking mechanism 470. As previously mentioned, locking mechanism 470 may include bearing retainer 474, bearings 476, plunger 478, and spring 479. This view illustrates that truncated-cone member 472 is disposed at the bottom of collar 473.

FIG. 21C is a cross-sectional diagram of a bottom portion of a leg 102 of telescoping shooting stand 100 when the inner leg 114 is fully retracted within outer tube 116, so that the leg is at its shortest extension. FIG. 21C shows that locking mechanism 470 may include a truncated-cone member 472, a bearing retainer 474, bearings 476, a tubular member 478, and a spring 479, as previously described. FIG. 21C also shows end cap 120.

Bearing retainer 474 may hold bearings 476 in place and may be attached to plunger 478. Truncated-cone member 472, in some embodiments, may be disposed around plunger 478 such that a tapered portion of truncated-cone member 472 can come into contact with bearings 476. As shown in this embodiment, truncated cone member is integral to collar 473, but in alternative embodiments, top portion of truncated-cone member 472 may be threaded to allow truncated-cone member 472 to attach to inner tube 114. When in the locked configuration shown, the conical surface of truncated cone member is in contact with the bearings 476 and presses them outward to contact the inner surface of outer tube 116, holding it in place so that inner tube 114 and outer tube 116 cannot move longitudinally in relation to each other.

Because truncated-cone member 472 is attached to inner tube 114 (via collar 473), it may stay stationary relative to plunger 478 and bearing retainer 474. Spring 479 may be positioned above truncated cone member 472 and may bias plunger 478 and bearing retainer 474 in a first position. In the first position (locking position), bearing retainer 474 holds bearings 476 against a top section of the tapered portion of truncated-cone member 472 such that truncated cone member 472 presses bearings 476 against an inside surface of outer tube 116. Thus, when bearing retainer 474 is in the first position, bearings 476 may prevent longitudinal movement of outer tube 116 relative to inner tube 114.

When release rod 222 is moved downward when the trigger is manipulated as described above, it moves release rod 222, plunger 478 and bearing retainer 474 in a downward direction to a second (release) position. Downward movement of plunger 478 relative to collar 473, which is fixed to the end of inner tube 114, compressing helical spring 479. In the second position, a lower portion of the tapered section of truncated-cone member 472 allows bearings 476 to move away from the inside surface of outer tube 116. Thus, in the second position, bearings 476 may not be forced against the inside surface of outer tube 116, allowing longitudinal movement of outer tube 116 relative to inner tube 114, thereby allowing extension of leg 102. Downward movement of plunger 478 may also cause nut 480 to engage the top of inner plug 482 inside outer tube 116, pushing outer tube 116 downward relative to inner tube 114, initiating longitudinal movement. Telescoping support stand 100 may include air exchange passages 484 in inner plug 482 that allow air to enter and exit enclosed area 490 between inner and outer tubes 114, 116, thereby reducing or eliminating the vacuum and dampening affects caused when enclosed area 490 is substantially sealed.

Thus, when a user pulls trigger 108, the release mechanism 220 is activated, pushing release rod 222 downward and locking mechanism 470 is released, allowing the tubes 114 and 116 to move longitudinally in relation to each other. When the trigger is released, the helical spring 479 can decompress, moving plunger 478 and bearing retainer 474 upward back to their first positions, and locking mechanism 470 locks the tubes 114 and 116 in their relative positions. Release of the trigger also allows compressed spring 174 to decompress, allowing displacement member 182 and release rod 222 move upward. For example, when the stand is in its normal upright position, pulling the trigger 108 will cause the release mechanism 470 to release and outer tube 116 can move longitudinally downward by gravitational force until it reaches a barrier to further movement, such as the ground. At that point, release of the trigger 108 will cause the tubes to be locked together at an extended length. Although each leg 102 comprises a release mechanism 470, the stand is configured so that when the release mechanism is released, each leg can independently extend downward until the ground is reached. In this way, a user can set up the stand 100 by pivoting the legs 102 independently outward toward their open, extended positions. Then the user can hold the stand at a desired position above the ground, which may be rough terrain. Pulling the trigger 108 releases the lock mechanism 470 in each leg, allowing each outer tube 116 to independently drop downward toward the ground until it makes contact. Stops at the upper ends of the outer tubes 116 and/or lower ends of inner tubes 114 may prevent the outer tubes 116 from sliding off tubes 114. Releasing the trigger 108 will lock the legs 102 and thereby the stand 100 in the positions they were when downward movement was halted by the ground. When a user wants to retract the legs back to their shortest length, the user may pull the trigger 108, allowing the outer tubes 116 to move longitudinally along the inner tubes 114 and shorten legs 102 by the weight of the accessory pushing downward on the tubes.

Figure 22:
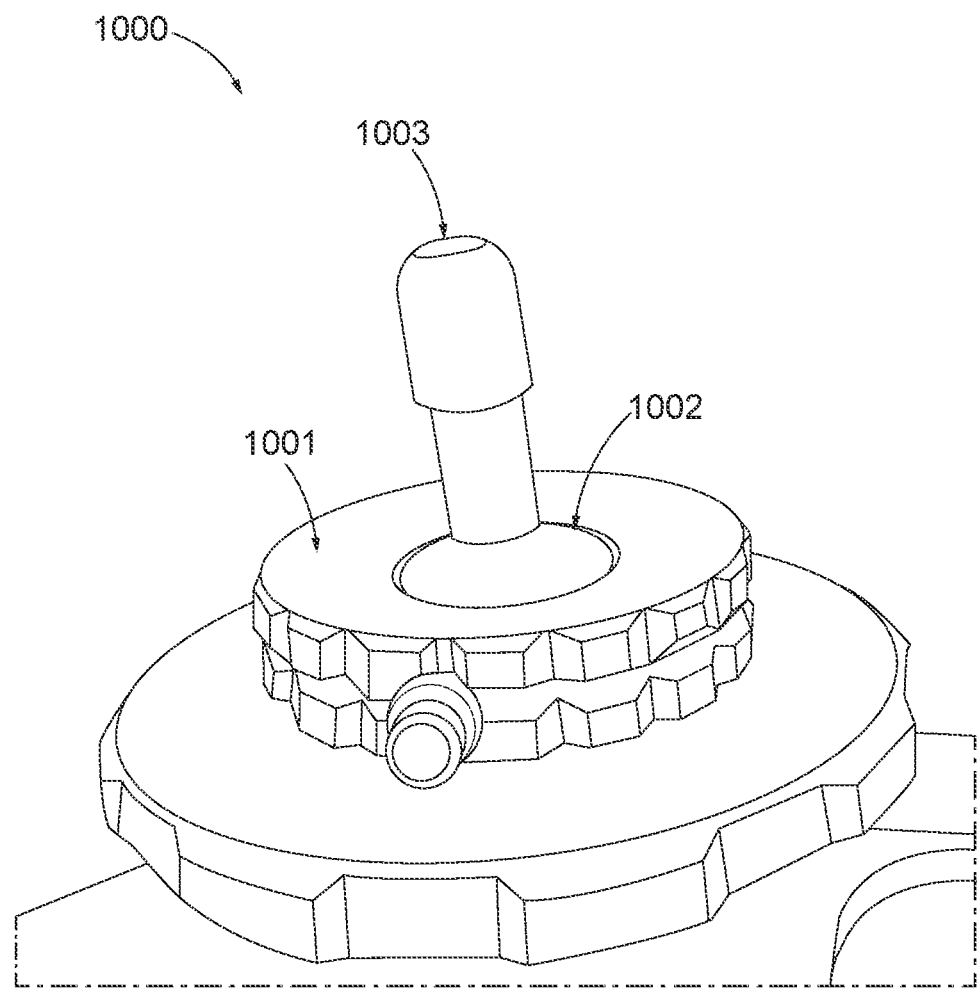
FIG. 22 shows another accessory mount configured to attach to the telescoping support stand comprising an accessory mounting assembly housing having an internal socket and a ball joint comprising a ball housed within the internal socket, in accordance with embodiments of the disclosure.

FIG. 22 shows another accessory mount 1000 configured to attach to the telescoping support stand, comprising an accessory mounting assembly housing 1001 having an internal socket and a ball joint comprising a ball 1002 housed within the internal socket, in accordance with embodiments of the disclosure. A post 1003 connected to the ball 1002 is configured to attach to an accessory.

EMBODIMENTS

The first aspect provides a telescoping support stand, comprising: a plurality of extendable legs, each leg comprising an outer tube; an inner tube having a first end portion that telescopically slides within the inner tube and a second end portion; a locking mechanism mounted to the first end portion of the inner tube; a release assembly configured to release the locking mechanism and allow the first tube and the second tube to move relative to each other; a connection assembly mounted to a first end of the release assembly; and a trigger assembly comprising a trigger pivotally mounted to the connection assembly and movable relative to the release assembly to actuate the release assembly to release the locking mechanism, wherein the trigger comprises first and second ends, the first end being pivotally attached to the trigger assembly about a trigger pivot axis and the second end is configured to be operated by a user to actuate the trigger assembly.

Embodiments of the telescoping support stand include the following alone or in any combination.

The release assembly comprises a displacement member in contact with a release rod; a displacement rod operationally connected to the first end of the trigger operable to actuate the displacement member to move the release rod, the release rod releasing the locking mechanism to allow relative movement between the outer and inner tubes. The release assembly wherein the displacement member is moved downward relative to the connection assembly to move the release rod downward to release the locking mechanism.

The trigger assembly further comprises a trigger assembly housing comprising a tubular clamp having opposed flanges, wherein the tubular clamp is configured to clamp around the connection assembly tube, and the trigger is pivotally mounted between the flanges.

The first end of the trigger may be an upwardly angled user actuated end and wherein the second end of the trigger is a contact end at the opposite end thereto, wherein the connection assembly tube further comprises a radial bore through which the trigger is disposed such that contact end is disposed within the connection assembly tube and is configured to engage the second end of the displacement rod within the connection assembly tube bore.

The telescoping support stand comprising two extendable legs.

The extendable legs define a plane, and wherein the trigger pivot axis is substantially perpendicular to the plane defined by the extendable legs; wherein the trigger is configured to pivot about the trigger pivot axis such that it remains within the plane defined by the extendable legs.

The connection assembly tube further comprises a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of displacement rod and is configured to have two curved ramp surfaces.

The extendable legs further comprise joint members disposed on ends thereof, wherein the joint members are positioned at least partially within the connection assembly housing, wherein a pair of curved actuation members each having a rollable wheel at a first end configured to rollably traverse the curved ramp surface, either towards or away from a vertical axis of the support stand apparatus that passes through connection assembly bore as extendable legs hingeably extend or retract towards or away from the vertical axis, thereby widening or narrowing the stance of the support stand apparatus.

Each curved actuation member may be pivotally attached to an upper portion of an extendable leg and configured to follow along a respective curved ramp surface via the rollable wheel of the displacement member when the extendable legs angularly rotate to extend or retract from the vertical axis of the support stand apparatus.

Each joint member has angled engagement surfaces configured to engage a second end of a respective actuation member.

The release rod may comprise an upper tip configured to engage and travel along a flange on the curved actuation member.

The upper end of each extendable leg may be engaged to a respective actuation member via a rotation disk eccentrically mounted on a first pivot point, and connected to a second pivot point near its edge.

The upper end of each extendable leg further comprises a nub member configured to meet a stop surface to limit the range of the angular rotation of extendable legs.

The locking mechanism may comprise a plunger operationally connected to the release rod, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

The locking mechanism is configured to move between a first position preventing the inner tube and the outer tube from moving relative to each other and a second position wherein the inner tube and the outer tube are allowed to move relative to each other.

In the first position, the conical surface of the truncated cone member is in contact with the plurality of bearings, pressing them against an inner surface of the outer tube and preventing the inner tube and the outer tube from moving relative to each other. In the second position the conical surface of the truncated cone member allows the bearings to move out of contact with the inner surface, allowing the inner tube and the outer tube from moving relative to each other.

Movement of the release rod downward moves the locking mechanism into the second position when a user pulls the trigger; and when the user releases the trigger, the locking mechanism is returned to the first position.

The telescoping support stand comprising an accessory mounting assembly disposed adjacent the trigger assembly configured to mount to an accessory.

The telescoping support stand comprising an accessory or accessory attachment member comprising a weapon mount, gun rest, gun mount, microphone clip, camera mount, telescope mount, projectile weapon, gun, rifle, crossbow, compressed-air gun, or other type of firearm or gun, camera, camcorder, laser rangefinder, professional photography equipment, telescope, or surveyors' equipment.

The connection assembly tube may be coupled to the accessory mounting assembly at a second end of the connection assembly tube, wherein the connection assembly tube is configured to couple the connection assembly to the accessory mounting assembly.

The accessory mounting assembly comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a first end which is fixed to the second end of the connection assembly tube.

The ball joint rod has a second end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection assembly by a user compresses the helical spring within the ball joint bore allowing movement of the accessory mounting assembly by rotating about the axis of the ball joint rod, wherein the ball joint rod is configured to follow the path of the T-shaped slot.

The accessory mounting assembly comprises a weapon mount configured to mount a weapon, wherein the weapon mount is configured to be mounted to at least one of a swivel stud or a rail attached to the weapon, wherein the weapon mount comprises a fixed rail and a movable rail which is configured to be movable toward and away from the fixed rail in order to clamp onto the rail attached to the weapon, wherein a locking lever is pivotally attached to the moveable rail configured to lock the movable rail relative to the fixed rail by a pivot connection.

The accessory mounting assembly comprises a weapon mount configured to mount a weapon, wherein the accessory mounting assembly further comprises a rail adapter, wherein the weapon mount comprises a fixed rail and a movable rail which is configured to be movable toward and away from fixed rail in order to clamp onto the rail adapter, wherein the rail adapter is mounted to the fixed rail and the movable rail by a locking nut, wherein the rail adapter has a V-shaped or U-shaped cross section and has a through hole for mounting to a swivel stud on the gun with the locking nut.

The connection assembly tube further comprises a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of displacement rod and is configured to have two curved ramp surfaces.

Another aspect provides a telescoping support stand, comprising: a plurality of extendable legs, each leg comprising an outer tube; an inner tube having a first end portion that telescopically slides within the inner tube and a second end portion; a locking mechanism mounted to the first end portion of the inner tube; a release assembly configured to release the locking mechanism and allow the first tube and the second tube to move relative to each other, the release assembly comprising a displacement member in contact with a release rod; a displacement rod operable to actuate the displacement member to move the release rod, the release rod releasing the locking mechanism to allow relative movement between the outer and inner tubes; a connection assembly mounted to a first end of the release assembly; a trigger assembly comprising a trigger pivotally mounted to the connection assembly and movable relative to the release assembly to actuate the displacement rod, wherein the trigger comprises first and second ends, the first end being pivotally attached to the trigger assembly about a trigger pivot axis; and an accessory mounting assembly disposed adjacent the trigger assembly configured to mount to an accessory; wherein the plurality of extendable legs define a plane, and wherein the trigger pivot axis is substantially perpendicular to the plane defined by the plurality of extendable legs; wherein the trigger is configured to pivot about the trigger pivot axis such that it remains within the plane defined by the extendable legs.

Embodiments include the following and the embodiments of the previously described stand, alone or in any combination.

The telescoping support stand comprising two telescoping legs.

The connection assembly further comprises a connection housing.

The trigger assembly further comprises a connection assembly tube coupled to the connection housing at a first end of the connection assembly tube, wherein the connection assembly tube is configured to couple the connection assembly to the trigger assembly.

The connection assembly tube is coupled to the accessory mounting assembly at a second end of the connection assembly tube, wherein the connection assembly tube is configured to couple the connection assembly to the weapon mounting assembly.

The accessory mounting assembly comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a first end which is fixed to the second end of the connection assembly tube.

The ball joint rod has a second end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection assembly by a user compresses the helical spring within the ball joint bore allowing movement of the accessory mounting assembly by rotating about the axis of the ball joint rod, wherein the ball joint rod is configured to follow the path of the T-shaped slot.

The accessory mounting assembly comprises a weapon mount configured to mount a weapon, wherein the weapon mount is configured to be mounted to at least one of a swivel stud or a rail attached to the weapon, wherein the weapon mount comprises a fixed rail and a movable rail which is configured to be movable toward and away from the fixed rail in order to clamp onto the rail attached to the weapon, wherein a locking lever is pivotally attached to the moveable rail configured to lock the movable rail relative to the fixed rail by a pivot connection.

The accessory mounting assembly comprises a weapon mount configured to mount a weapon, wherein the accessory mounting assembly further comprises a rail adapter, wherein the weapon mount comprises a fixed rail and a movable rail which is configured to be movable toward and away from fixed rail in order to clamp onto the rail adapter, wherein the rail adapter is mounted to the fixed rail and the movable rail by a locking nut, wherein the rail adapter is V-shaped or U-shaped and has a through hole for mounting to a swivel stud on the gun with the locking nut.

The connection assembly tube further comprises a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of displacement rod and is configured to have two curved ramp surfaces.

The extendable legs further comprise joint members disposed on ends thereof, wherein the joint members are positioned at least partially within the connection assembly housing, wherein a pair of curved actuation members each having a rollable wheel at a first end configured to rollably traverse the curved ramp surface, either towards or away from a vertical axis of the support stand apparatus that passes through connection assembly bore as extendable legs hingeably extend or retract towards or away from the vertical axis, thereby widening or narrowing the stance of the support stand apparatus.

Each curved actuation member may be pivotally attached to an upper portion of an extendable leg and configured to follow along a respective curved ramp surface via the rollable wheel of the displacement member when the extendable legs angularly rotate to extend or retract from the vertical axis of the support stand apparatus.

Each joint member has angled engagement surfaces configured to engage a second end of a respective actuation member.

An upper end of each extendable leg further comprises a nub member configured to meet a stop surface to limit the range of the angular rotation of extendable legs.

The trigger assembly further comprises a trigger assembly housing comprising a tubular clamp having opposed flanges, wherein the tubular clamp is configured to clamp around the connection assembly tube, and the trigger is pivotally mounted between the flanges.

The first end of the trigger is an upwardly angled user actuated end and wherein the second end of the trigger is a contact end at the opposite end thereto, wherein the connection assembly tube further comprises a radial bore through which the trigger is disposed such that contact end is disposed within the connection assembly tube and is configured to engage the second end of the displacement rod within the connection assembly tube bore.

The release rod comprises an upper tip configured to engage and travel along a flange on the curved actuation member.

The upper end of each extendable leg may be engaged to the actuation member via a rotation disk eccentrically mounted on a first pivot point, and connected to a second pivot point near its edge.

The locking mechanism comprises a plunger operationally connected to the release rod, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

The locking mechanism is configured to move between a first position preventing the inner tube and the outer tube from moving relative to each other and a second position wherein the inner tube and the outer tube are allowed to move relative to each other.

In the first position, the conical surface of the truncated cone member is in contact with the plurality of bearings, pressing them against an inner surface of the outer tube and preventing the inner tube and the outer tube from moving relative to each other. In the second position the conical surface of the truncated cone member allows the bearings to move out of contact with the inner surface, allowing the inner tube and the outer tube to move relative to each other. In embodiments, movement of the release rod downward moves the locking mechanism into the second position when a user pulls the trigger. When the user releases the trigger, the locking mechanism is returned to the first position.

Another aspect provides an accessory mounting assembly comprising an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a first end which is fixed to the second end of the connection assembly tube.

The ball joint rod has a second end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the accessory mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

The accessory mounting assembly is configured to be attached to a telescoping support stand, wherein upon pulling up on the accessory mounting assembly relative to a connection assembly of the telescoping support stand by a user compresses the helical spring within the ball joint bore allowing movement of the accessory mounting assembly by rotating about the axis of the ball joint rod, wherein the ball joint rod is configured to follow the path of the T-shaped slot.

The accessory mounting comprises a weapon mount configured to mount a weapon, wherein the weapon mount is configured to be mounted to at least one of a swivel stud or a rail attached to the weapon, wherein the weapon mount comprises a fixed rail and a movable rail which is configured to be movable toward and away from the fixed rail in order to clamp onto the rail attached to the weapon, wherein a locking lever is pivotally attached to the moveable rail configured to lock the movable rail relative to the fixed rail by a pivot connection.

The accessory mounting assembly comprises a weapon mount configured to mount a weapon, wherein the accessory mounting assembly further comprises a rail adapter, wherein the weapon mount comprises a fixed rail and a movable rail which is configured to be movable toward and away from fixed rail in order to clamp onto the rail adapter, wherein the rail adapter is mounted to the fixed rail and the movable rail by a locking nut, wherein the rail adapter has a V-shaped or U-shaped cross section and has a through hole for mounting to a swivel stud on the gun with the locking nut.

Many alternatives, modifications, and variations are enabled by the present disclosure. While specific embodiments have been shown and described in detail to illustrate the application of the principles of the invention, it will be understood that the exemplary embodiments may be embodied otherwise without departing from such principles. Accordingly, Applicants intend to embrace all such alternatives, modifications, equivalents, and variations that are within the spirit and scope of the exemplary embodiments.

What is claimed is:

1. A telescoping support stand, comprising:
   two extendable legs, each leg comprising an outer tube; an inner tube having a first end portion that telescopically slides within the outer tube and a second end portion;
   a locking mechanism mounted to the first end portion of the inner tube;
   a release assembly configured to release the locking mechanism and allow the first tube and the second tube to move relative to each other;
   a connection assembly comprising a connection housing mounted to a first end of the release assembly comprising a connection assembly tube coupled to the connection housing at a first end of the connection assembly tube, wherein the connection assembly tube is configured to couple the connection assembly to a trigger assembly; and the connection assembly tube is coupled to an accessory mounting assembly at a second end of the connection assembly tube, wherein the connection assembly tube is configured to couple the connection assembly to the accessory mounting assembly;
   a trigger assembly comprising a trigger pivotally mounted to the connection assembly and movable relative to the release assembly to actuate the release assembly to release the locking mechanism, wherein the trigger comprises first and second ends, the first end being pivotally attached to the trigger assembly about a trigger pivot axis and the second end is configured to be operated by a user to actuate the trigger assembly; and
   an accessory mounting assembly disposed adjacent the trigger assembly configured to mount to an accessory;
   wherein the connection assembly tube comprises a connection assembly bore extending axially through the connection assembly tube and displacement rod disposed within the connection assembly bore, wherein the displacement rod is configured for biased movement relative to connection assembly bore, wherein the displacement rod has a first end configured to engage with the trigger, wherein a displacement member is coupled to a second end of the displacement rod and is configured to have two curved ramp surfaces; and wherein the extendable legs further comprise joint members disposed on ends thereof, wherein the joint members are positioned at least partially within the connection assembly housing, wherein a pair of curved actuation members each having a rollable wheel at a first end configured to rollably traverse one of the two curved ramp surfaces, either towards or away from a vertical axis of the support stand apparatus that passes through connection assembly bore as extendable legs hingeably extend or retract towards or away from the vertical axis, thereby widening or narrowing the stance of the support stand apparatus.

2. The telescoping support stand of claim 1 wherein the displacement member is in contact with a release rod; and the displacement rod is operationally connected to the first end of the trigger operable to actuate the displacement member to move the release rod, the release rod releasing the locking mechanism to allow relative movement between the outer and inner tubes.

3. The telescoping support stand of claim 1 wherein the connection assembly tube further comprises a helical spring disposed within the connection assembly bore, wherein the displacement rod is disposed within the helical spring within the connection assembly bore.

4. The telescoping support stand of claim 1 wherein each curved actuation member is pivotally attached to an upper portion of an extendable leg and configured to follow along a respective curved ramp surface via the rollable wheel of the displacement member when the extendable legs angularly rotate to extend or retract from the vertical axis of the support stand apparatus.

5. The telescoping support stand of claim 1 wherein the release rod comprises an upper tip configured to engage and travel along a flange on the curved actuation member.

6. The telescoping support stand of claim 1 wherein the upper end of each extendable leg is engaged to a respective actuation member via a rotation disk eccentrically mounted on a first pivot point, and connected to a second pivot point near its edge.

7. The telescoping support stand of claim 1 wherein the locking mechanism comprises a plunger operationally connected to the release rod, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

8. The telescoping support stand of claim 7 wherein the locking mechanism is configured to move between a first position preventing the inner tube and the outer tube from moving relative to each other and a second position wherein the inner tube and the outer tube are allowed to move relative to each other.

9. The telescoping support stand of claim 8 wherein in the first position, the conical surface of the truncated cone member is in contact with the plurality of bearings, pressing them against an inner surface of the outer tube and preventing the inner tube and the outer tube from moving relative to each other; and in the second position the conical surface of the truncated cone member allows the bearings to move out of contact with the inner surface, allowing the inner tube and the outer tube to move relative to each other.

10. The telescoping support stand of claim 1 wherein the accessory mounting assembly comprises an accessory mounting assembly housing having an internal socket and a ball joint comprising a ball housed within the internal socket.

11. A telescoping support stand, comprising:
a pair of extendable legs, each leg comprising an outer tube; an inner tube having a first end portion that telescopically slides within the outer tube and a second end portion; and a locking mechanism mounted to the first end portion of the inner tube comprising a plunger operationally connected to a release rod of a release assembly, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings;

a connection assembly mounted to a first end of the release assembly comprising a connection housing and a connection assembly comprising a connection assembly tube comprising a connection assembly bore extending axially through the connection assembly tube, wherein the connection assembly further comprises a helical spring disposed within the connection assembly bore, wherein the displacement rod is disposed within the helical spring within the connection assembly bore, wherein the displacement rod is configured for biased movement relative to connection assembly bore, wherein the displacement rod has a first end configured to engage with the trigger, wherein a displacement member is coupled to a second end of the displacement rod and is configured to have curved ramp surfaces;

the release assembly is configured to release the locking mechanism and allow the first tube and the second tube to move relative to each other, the release assembly comprising a displacement member in contact with a release rod; a displacement rod operable to actuate the displacement member to move the release rod, the release rod releasing the locking mechanism to allow relative movement between the outer and inner tubes;

a trigger assembly comprising a trigger pivotally mounted to the connection assembly and movable relative to the release assembly to actuate the displacement rod, wherein the trigger comprises first and second ends, the first end being pivotally attached to the trigger assembly about a trigger pivot axis; and an accessory mounting assembly disposed adjacent the trigger assembly configured to mount to an accessory;

wherein the pair of extendable legs define a plane, and wherein the trigger pivot axis is substantially perpendicular to the plane defined by the plurality of extendable legs; wherein the trigger is configured to pivot about the trigger pivot axis such that it remains within the plane defined by the extendable legs;

wherein the extendable legs further comprise joint members disposed on ends thereof, wherein the joint members are positioned at least partially within the connection assembly housing, wherein a pair of curved actuation members each having a rollable wheel at a first end configured to rollably traverse the curved ramp surface of the displacement member, either towards or away from a vertical axis of the support stand apparatus that passes through connection assembly bore as extendable legs hingeably extend away from or retract towards the vertical axis, thereby widening or narrowing the stance of the support stand apparatus.

12. The telescoping support stand of claim 11 wherein the trigger assembly further comprises a trigger assembly housing comprising a tubular clamp having opposed flanges, wherein the tubular clamp is configured to clamp around the connection assembly tube, and the trigger is pivotally mounted between the flanges.

13. The telescoping support stand of claim 11 wherein each curved actuation member may bois pivotally attached to an upper portion of an extendable leg and configured to follow along a respective curved ramp surface of the displacement member via the rollable wheel when the extendable legs angularly rotate to extend or retract from the vertical axis of the support stand apparatus.

14. The telescoping support stand of claim 11 wherein the upper end of each extendable leg is engaged to a respective actuation member via a rotation disk eccentrically mounted on a first pivot point, and connected to a second pivot point near its edge.

15. The telescoping support stand of claim 11 wherein the locking mechanism is configured to move between a first position preventing the inner tube and the outer tube from moving relative to each other and a second position wherein the inner tube and the outer tube are allowed to move relative to each other.

16. The telescoping support stand of claim 15 wherein in the first position, the conical surface of the truncated cone member is in contact with the plurality of bearings, pressing them against an inner surface of the outer tube and preventing the inner tube and the outer tube from moving relative to each other; and in the second position the conical surface of the truncated cone member allows the bearings to move out of contact with the inner surface, allowing the inner tube and the outer tube to move relative to each other.

17. A telescoping support stand, comprising:
two extendable legs, each leg comprising a locking mechanism configured to lock each leg in a desired length and a release assembly configured to release the locking mechanism and allow each leg to extend to the desired length;
a connection assembly comprising a connection housing mounted to a first end of the release assembly comprising a connection assembly tube coupled to the connection housing at a first end of the connection assembly tube, wherein the connection assembly tube is configured to couple the connection assembly to a trigger assembly; and the connection assembly tube is coupled to an accessory mounting assembly at a second end of the connection assembly tube, wherein the connection assembly tube is configured to couple the connection assembly to the accessory mounting assembly;
a trigger assembly comprising a trigger pivotally mounted to the connection assembly and movable relative to the release assembly to actuate the release assembly to release the locking mechanism, wherein the trigger comprises first and second ends, the first end being pivotally attached to the trigger assembly about a trigger pivot axis and the second end is configured to be operated by a user to actuate the trigger assembly; and
an accessory mounting assembly disposed adjacent the trigger assembly configured to mount to an accessory;
wherein the connection assembly tube comprises a connection assembly bore extending axially through the connection assembly tube and displacement rod disposed within the connection assembly bore, wherein the displacement rod is configured for biased movement relative to connection assembly bore, wherein the displacement rod has a first end configured to engage with the trigger, wherein a displacement member is coupled to a second end of the displacement rod and is configured to have two curved ramp surfaces;
wherein the extendable legs further comprise joint members disposed on ends thereof, wherein the joint members are positioned at least partially within the connection assembly housing, wherein a pair of curved actuation members each having a rollable wheel at a first end configured to rollably traverse one of the two curved ramp surfaces, either towards or away from a vertical axis of the support stand apparatus that passes through connection assembly bore as the extendable legs hingeably extend or retract towards or away from the vertical axis, thereby widening or narrowing the stance of the support stand apparatus.

18. The telescoping support stand of claim 17 wherein each extendable leg comprises an outer tube; an inner tube having a first end portion that telescopically slides within the outer tube and a second end portion and the locking mechanism is mounted to the first end portion of the inner tube; and
the displacement member is in contact with a release rod within each extendable leg; and the displacement rod is operationally connected to the first end of the trigger operable to actuate the displacement member to move the release rod, the release rod releasing the locking mechanism to allow relative movement between the outer and inner tubes of each extendable leg.

19. The telescoping support stand of claim 18 wherein the locking mechanism comprises a plunger operationally connected to the release rod, a collar attached to the bottom of inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

20. The telescoping support stand of claim 17 wherein the connection assembly tube further comprises a helical spring disposed within the connection assembly bore, wherein the displacement rod is disposed within the helical spring within the connection assembly bore.

* * * * *